US010992845B1

(12) United States Patent
Seely et al.

(10) Patent No.: US 10,992,845 B1
(45) Date of Patent: Apr. 27, 2021

(54) HIGHLIGHT RECOVERY TECHNIQUES FOR SHALLOW DEPTH OF FIELD RENDERING

(71) Applicant: Apple Inc., Cupertino, CA (US)

(72) Inventors: Richard D. Seely, San Jose, CA (US); Shuang Gao, Sunnyvale, CA (US); Alexandre Naaman, Mountain View, CA (US); Patrick Shehane, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/565,965

(22) Filed: Sep. 10, 2019

Related U.S. Application Data

(60) Provisional application No. 62/729,644, filed on Sep. 11, 2018.

(51) Int. Cl.
*H04N 5/222* (2006.01)
*H04N 5/232* (2006.01)
*G06T 5/20* (2006.01)
*G06T 5/00* (2006.01)

(52) U.S. Cl.
CPC ........... *H04N 5/2226* (2013.01); *G06T 5/002* (2013.01); *G06T 5/20* (2013.01); *H04N 5/232125* (2018.08)

(58) Field of Classification Search
CPC ............ H04N 5/2226; H04N 5/232125; G06T 5/002; G06T 5/20
See application file for complete search history.

(56) References Cited

U.S. PATENT DOCUMENTS

| 5,048,109 A | 9/1991 | Bloomberg |
| 8,429,173 B1 | 4/2013 | Rosenberg |
| 8,861,884 B1 | 10/2014 | Fang |
| 9,094,609 B2 | 7/2015 | Kim |
| 9,171,352 B1 | 10/2015 | Raynaud |

(Continued)

FOREIGN PATENT DOCUMENTS

JP H06231273 A 8/1994

OTHER PUBLICATIONS

Ramakrishnan, Harish Narayanan, "Detection and estimation of image blur," Masters Thesis, Missouri University of Science and Technology, Fall 2010.

*Primary Examiner* — Timothy J Henn
(74) *Attorney, Agent, or Firm* — Blank Rome LLP

(57) ABSTRACT

This disclosure relates to techniques for synthesizing out of focus blurring effects in digital images. Cameras having wide aperture lenses typically capture images with a shallow depth of field (SDOF). SDOF cameras are often used in portrait photography, since they emphasize subjects, while deemphasizing the background via blurring. Simulating this kind of blurring using a large depth of field (LDOF) camera may require a large amount of computational resources, i.e., to simulate the physical effects of using a wide aperture lens, while constructing a synthetic SDOF image. Moreover, cameras having smaller lens apertures, such as those in mobile phones, may not have the ability to accurately estimate or recreate the true color of clipped background light sources. Described herein are techniques to synthesize out of focus background blurring effects that attempt to reproduce accurate light intensity and color values for clipped background light sources in images captured by LDOF cameras.

20 Claims, 11 Drawing Sheets

(56) References Cited

U.S. PATENT DOCUMENTS

| | | | |
|---|---|---|---|
| 9,349,165 B2 | 5/2016 | Cho | |
| 2006/0187308 A1 | 8/2006 | Lim | |
| 2007/0189748 A1* | 8/2007 | Drimbarean | G06T 5/20 |
| | | | 396/89 |
| 2010/0123807 A1 | 5/2010 | Lee | |
| 2012/0063697 A1 | 3/2012 | Han | |
| 2013/0208093 A1* | 8/2013 | Sun | G06T 5/003 |
| | | | 348/46 |
| 2013/0243330 A1 | 9/2013 | Chiu | |
| 2013/0308005 A1* | 11/2013 | Takahashi | G06K 9/6215 |
| | | | 348/222.1 |
| 2014/0218550 A1* | 8/2014 | Chuang | H04N 5/23229 |
| | | | 348/208.6 |
| 2014/0347350 A1 | 11/2014 | Tseng | |
| 2015/0002545 A1 | 1/2015 | Webster | |
| 2015/0043808 A1* | 2/2015 | Takahashi | G06T 5/50 |
| | | | 382/154 |
| 2015/0054986 A1 | 2/2015 | Tanaka | |
| 2015/0062384 A1* | 3/2015 | Tanaka | H04N 5/2628 |
| | | | 348/240.2 |
| 2015/0110404 A1 | 4/2015 | Cho | |
| 2015/0172547 A1 | 6/2015 | Wang | |
| 2015/0294523 A1 | 10/2015 | Smith | |
| 2016/0048952 A1 | 2/2016 | Tezaur | |
| 2018/0350043 A1* | 12/2018 | Seely | G06T 5/50 |
| 2019/0362199 A1* | 11/2019 | Lin | G06K 9/00664 |
| 2020/0082535 A1* | 3/2020 | Lindskog | G06K 9/00221 |

\* cited by examiner

HIGHLIGHT RECOVERY TECHNIQUES FOR SHALLOW DEPTH OF FIELD RENDERING

CROSS-REFERENCE TO RELATED APPLICATION

This application is related to commonly-owned U.S. patent application Ser. No. 15/990,154, filed May 25, 2018, and entitled, "Shallow Depth of Field Rendering" (hereinafter, "the '154 application"). The '154 application is hereby incorporated by reference in its entirety.

TECHNICAL FIELD

This disclosure relates generally to the field of digital imaging. More particularly, but not by way of limitation, it relates to techniques for recovering and boosting highlight information when synthesizing out of focus blurring effects (also known as "shallow depth of field," "SDOF," or "bokeh" effects).

BACKGROUND

In camera imaging, multiple factors, such as the size of the lens aperture, may influence the depth of field of an image. Large digital single-lens reflex (DSLR) cameras and cameras having wide aperture lenses can be used to capture images with a relatively shallow depth of field (SDOF), meaning that the range of scene depths for which objects in the captured image will appear sharp (i.e., in focus) is very small compared to images captured under other conditions (e.g., a narrower aperture). While the limited range of in-focus regions of a SDOF image may seem to be a physical limitation, it has been turned into an aesthetic advantage by photographers for over a century. For example, so-called SDOF photography may be particularly fit for portrait photography, since it emphasizes the subject (who is typically brought into the camera's focus range), while deemphasizing the background (e.g., by making the background appear blurry and/or out of focus), which may otherwise be of little interest in the scene.

In imaging systems with larger image sensors and/or larger lens apertures (e.g., "true" SDOF cameras), background or point light sources captured by the image sensor are often quite defocused, i.e., due to the smaller field of view that results from the larger focal length and/or aperture size of the camera. This results in the light sources being spread over a much larger area on the image sensor, with the light received per pixel being significantly lower, resulting in a lower likelihood of the pixels clipping or losing all color information.

In other imaging systems, such as small form factor cameras typically used in mobile devices, it may be difficult to optically achieve a given level of SDOF. For example, a mobile phone camera may have a smaller aperture than the smallest aperture used by a DSLR or other true SDOF camera, and thus may have a relatively large depth of field compared to what may be achieved by a true SDOF camera. In these instances, to achieve an image having the appearance of a shallower depth of field, it may be necessary to artificially introduce/simulate an out-of-focus blur in the image after it is captured.

However, synthetically creating a natural-looking SDOF effect in an image captured by a non-SDOF camera, such as on a mobile device, may be difficult. In particular, when bright light sources (e.g., point light sources) are present in the background of images, especially images captured in low-light conditions, such light sources are often heavily clipped in the resulting image captured by the non-SDOF camera device's image sensor—meaning that the "true" light intensity and color for the pixels that the light source is projected onto will be unknown, i.e., they will be captured by the image sensor as pure white pixels.

This effect can be exacerbated by the aforementioned compact image sensor and optics that are typically found on mobile devices, which result in the device's camera having a comparatively large depth of field. These characteristics of typical mobile device cameras also cause background light sources to be spread over very few pixels on the image sensor, resulting in the light level arriving on each pixel being much higher than what can be measured by the image sensor. For very bright light sources, the color filters on the image sensor's pixels may also fail to provide sufficient attenuation of dissimilar colors, causing all recorded color channels (typically red, green, and blue) to be clipped, resulting in the aforementioned pure white pixel values being recorded for such pixels—as opposed to the actual color of the light source.

Additionally, attempting to synthetically simulate this kind of out-of-focus blurring may require a large amount of computational resources. For example, a naïve approach may attempt to simulate the SDOF effects by spreading every pixel in the image's light intensity onto every other pixel in the image that is within its blurring radius, adding all those values in an accumulator, and then repeating that spreading and accumulation process for every pixel in the image that needs to be blurred. Such approaches also may require meticulous user intervention and fine tuning to adjust the resulting image to have an acceptable synthetic SDOF effect, e.g., with minimal physically-inaccurate occlusions, mischaracterizations of foreground pixels as background pixels (or vice versa), etc.

The advent of mobile, multifunction devices, such as smartphones and tablet devices, has resulted in a desire for high-resolution, high dynamic range, and small form factor cameras, capable of generating high levels of image quality in real time or near-real time, for integration into such mobile, multifunction devices. Increasingly, as users rely on these multifunction devices as their primary cameras for day-to-day use, users demand features, e.g., portrait photography, which they have become accustomed to using in dedicated-purpose camera bodies.

Thus, what is needed are techniques to synthesize SDOF effects, e.g., out-of-focus background renderings, that attempt to more accurately synthesize regions of the SDOF image corresponding to clipped background highlights, and that do so in a computationally-efficient manner. Such techniques may be applied to images to create the effect of a shallower depth of field than would normally be seen in images naturally captured by a device's camera system.

SUMMARY

Electronic devices, computer readable storage media, and related methods are disclosed herein that are configured to synthesize out-of-focus background rendering in a computationally-efficient manner for images captured by large depth of field ("LDOF") cameras, such as small form-factor cameras having smaller lens apertures. This synthetic rendering may be used to approximate an image captured with a SDOF. It should be appreciated that any description of creating/synthesizing/rendering a SDOF or out-of-focus effect from a LDOF image (or image captured from a LDOF camera) is meant to capture a relative change in the depth of field of the image (i.e., the image has a first "large" depth of field when captured that is synthetically reduced to a smaller "shallow" depth of field) and not to imply any particular ranges of depth of field.

According to some embodiments disclosed herein, the camera devices may utilize one (or more) image sensors to capture an input image, as well as corresponding depth/disparity information data for the captured scene that may indicate the portions of the image that are in the scene's background and/or foreground (e.g., by using a secondary stereo camera and/or other types of depth sensors). According to some such embodiments, the depth information data may be converted into and/or represented in the form of a blur map, e.g., a two-dimensional array of blur values, wherein each blur value represents a radius, diameter (or other size-indicative parameter) of the blurring "circle of confusion" of the corresponding pixel in the captured image.

After capturing the input image, various pieces of highlight "gating" information may be determined and stored with the input image, e.g., in the form of metadata information, such as tuning parameters. For example, according to some embodiments, a gating algorithm may be executed on the input image that attempts to count (and/or locate) the number of clipped pixels that are in the background of the input image. Based on the percentage of clipped pixels located in the input image, as well as a calculated exposure score for the capture of the input image, a highlight recovery/boosting strength score may be determined. It is noted that, if too many clipped pixels are located in the input image, e.g., as established by one or more thresholds, then the aforementioned highlight recovery recovery/boosting strength score may be set to zero, so that additional highlight recovery and boosting are not applied in a later synthetic SDOF rendering stage.

According to some embodiments, various additional pre-processing operations may be performed on the input image, e.g., to convert the input image into a desired color space and/or to include the corresponding information from the highlight gating process and/or the blur map with the input image.

In embodiments where a non-zero highlight recovery/boosting strength score has been determined, an iterative process may be performed on the regions of the input image where the clipped pixels have been located by the gating process, in an attempt to recover and recreate the "true" color values of such clipped pixels (i.e., as if the image sensor had been able to capture such clipped pixels' values without clipping), based, at least in part, on the color information stored in neighboring non-clipped pixels.

At this stage, one or more pre-filtering operations may be performed on the image (as will be explained in greater detail below), followed by a sparse sampling operation, which may be performed in the neighborhood of pixels surrounding each image pixel. That is, rather than "spreading" the light of each pixel onto all other pixels within the blurring radius and accumulating the results, the process may sparsely sample (e.g., using a randomized or pseudo-randomized set of samples approximately evenly-distributed in a circular-shaped (or other desired shape) region around each respective input image pixel) some number of pixels in the surrounding neighborhood of input image pixels and gather the blur radius and color information from such neighboring pixels to adjust the output value of the base input pixel based on the gathered information. This process is also referred to herein as "gathering."

According to some embodiments, the process may weight the color intensity information values from each sparsely-sampled neighborhood pixel, e.g., based on a determination of how prominent each such neighborhood pixel should be in the output synthetic SDOF image. The weighting process may further include a weight that reflects an amount by which a given sampled pixel's weight should be boosted based on the degree to which it represents a background highlight (referred to herein as the "highlight boosting weight gain" or $W_{boost}$) and/or a gain value that reflects an amount by which a given sampled pixel's intensity should be boosted based on the degree to which it represents a background highlight (referred to herein as the "highlight boosting intensity gain" or $G_{boost}$).

After the values of the output pixels in the image have been altered based on the weighted contributions of the sparsely-sampled neighborhood pixels, an anti-aliasing process may be performed to account for any undesirable noise artifacts that may have been caused, e.g., by the sparseness of the sampling. Finally, the pixel information may be selectively up-sampled, and converted back into the desired color space for the output synthetic SDOF image.

According to some embodiments, special care may be taken when blurring the background portions to the original input image, e.g., to help the resultant synthesized image maintain the look and feel of a true/real optical system. For example, the blurred background discs (or other synthesized background elements to simulate SDOF effects) should be configured such that, to the extent possible, they do not occlude, i.e., block, an object that is in the foreground of the scene and likely in sharp focus (or, in some instances, an object at a shallower scene depth than the background light source being blurred), as that would potentially result in an unnatural effect in the synthesized SDOF image.

Further advantages of the techniques disclosed herein include the fact that the color and intensity of highlights in the captured scene are more accurately estimated in the synthesized SDOF image (e.g., in the event of saturated sensor pixels), edges in the scene are more accurately preserved (e.g., sharp changes in depth between the edges of foreground objects and the scene background), and random pixel sampling distributions are generated in a computationally-effective manner (e.g., by using a sampling region having a uniform sampling probability across the region, as will be discussed in further detail below).

Thus, according to some embodiments, a non-transitory program storage device is disclosed. The program storage device is readable by a programmable control device. Instructions are stored on the program storage device for causing the programmable control device to: obtain a first image comprising a first plurality of pixels having values; obtain a first blur map, wherein the first blur map comprises a plurality of blur values, each blur value corresponding to a pixel in the first plurality of pixels; for each of one or more pixels of the first plurality of pixels: select a second plurality of candidate pixels surrounding the respective pixel from the one or more pixels of the first plurality of pixels; and compute a blurred value for the respective pixel from the one or more pixels of the first plurality of pixels based, at least in part, on a weighted combination of one or more characteristics of each of the second plurality of candidate pixels, wherein a first one of the one or more characteristics of each of the second plurality of candidate pixels comprises a weighting factor based on a degree to which the respective candidate pixel's corresponding value in the first plurality of pixels represents a background highlight in the first image; and generate a blurred version of the first image based, at least in part, on the computed blur values of the one or more pixels of the first plurality of pixels.

Various methods of synthesizing out-of-focus image effects for images are also disclosed herein, in accordance with the program storage device embodiments enumerated above.

Various electronic imaging devices are also disclosed herein, in accordance with the program storage device embodiments enumerated above. Such electronic devices may include one or more image capture devices, one or more processors, and a memory coupled to the one or more processors. Instructions are stored in the memory, the instructions causing the one or more processors to perform techniques in accordance with the program storage device embodiments enumerated above.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1A:
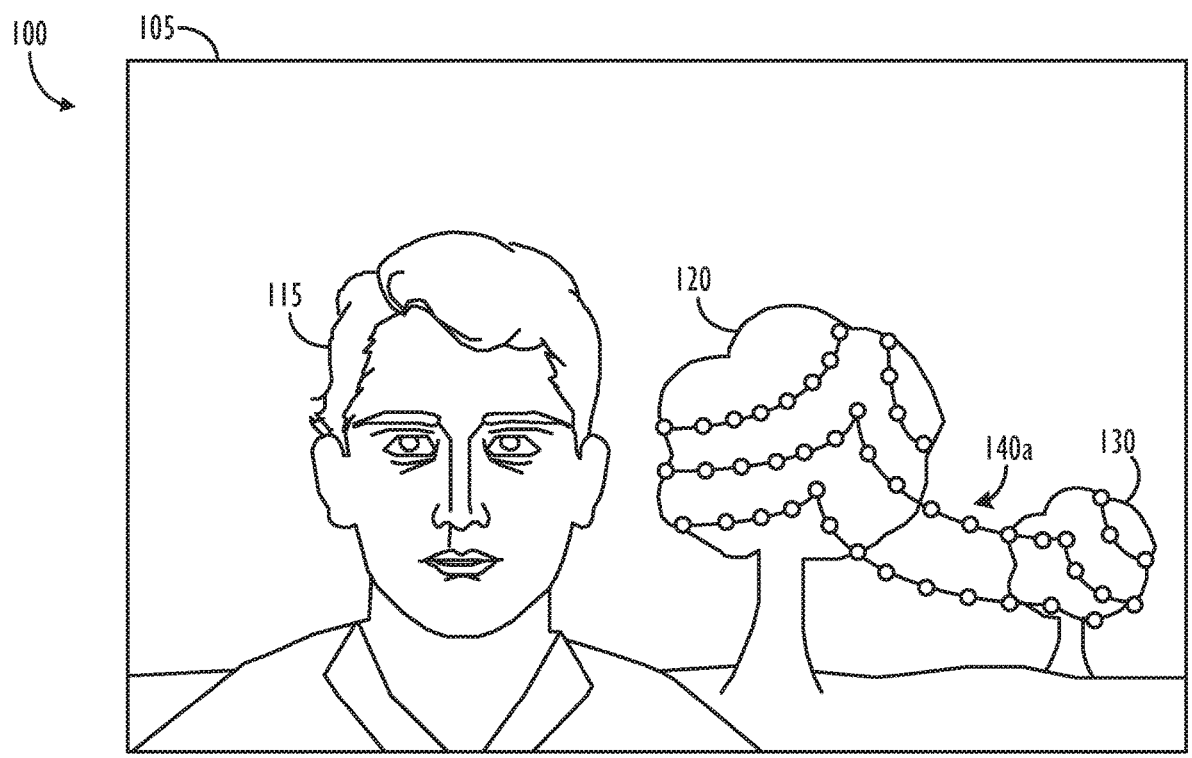
FIG. 1A is a sample image of a scene to which synthetic SDOF effects are desired to be applied.

Turning now to FIG. 1A, a sample image 100 of a scene 105 to which synthetic SDOF effects are desired to be applied is shown. The scene 105 comprises human subject 115 in the foreground of scene 105, as well as several elements in the background of scene 105, e.g.: trees 120 and 130, and individual point light sources 140a. The background of scene 105 in image 100 is shown as largely white (i.e., with no gray overlay), indicating that the background is largely in focus in image 100. Very bright light sources in images captured by small form factor cameras having relatively long integration times tend to be largely in focus, but run a risk of fully saturating the corresponding pixels on the camera's image sensor (thus, appearing as pure white in the image 100, even if such light sources actually had a distinct color in scene 105).

Figure 1B:
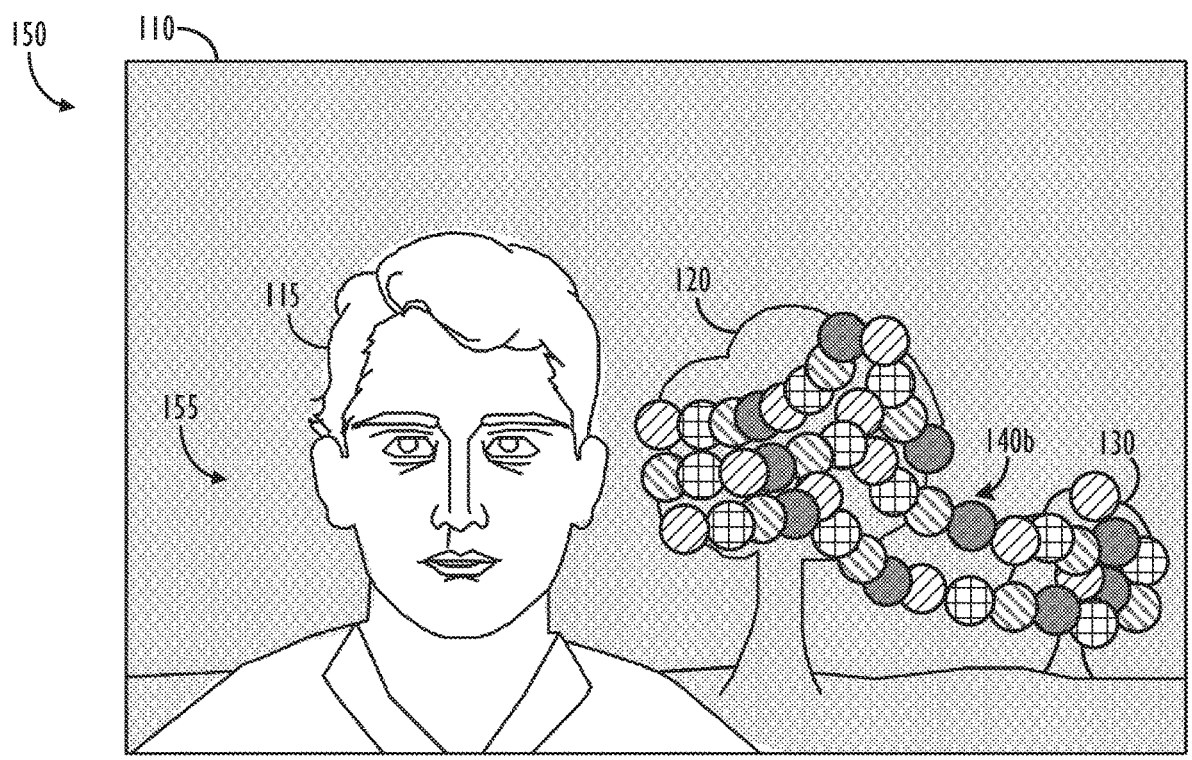
FIG. 1B is a sample image of a scene to which synthetic SDOF effects have been applied, according to one or more embodiments.

Turning now to FIG. 1B, a sample image 150 of scene 110 to which synthetic SDOF effects have been applied is shown, according to one or more embodiments. As compared to image 100 in FIG. 1A, the background of scene 110 in image 150 in FIG. 1B is shown as largely having a gray overlay, indicating that the background is blurred (or otherwise made to appear out of focus) in image 150. Moreover, the elements of scene 110 indicated above in the description of FIG. 1A as being bright enough that they saturated the corresponding pixels on the camera's image sensor (i.e., individual point light sources 140a) have been represented as enlarged and blurred bokeh disc shapes, as seen, e.g., in the representation of individual point light sources 140b in FIG. 1B (wherein different shading patterns represent different colors of the various point light sources 140b). Improved techniques for producing synthetic SDOF effects, e.g., those illustrated in image 150 of FIG. 1B, will now be described in further detail.

Figure 1C:
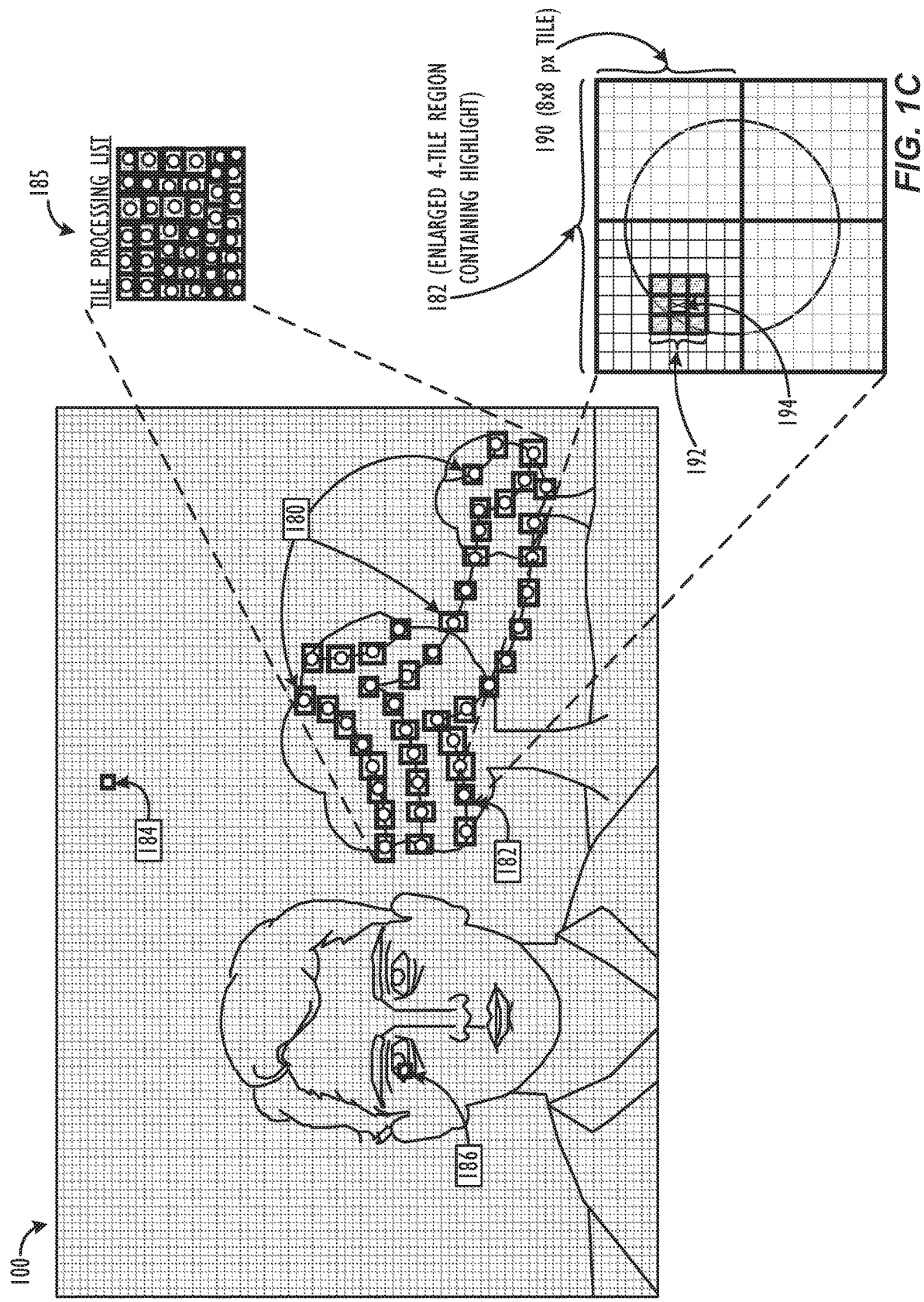
FIG. 1C illustrates exemplary tiles created over a sample image of a scene to which synthetic SDOF effects are desired to be applied, according to one or more embodiments.

As will be explained in greater detail below, in some embodiments, it may be desirable to identify one or more sub-regions within the image that contain what are likely to be clipped background highlight pixels, so that only the pixels in such identified sub-regions may be subjected to special highlight recovery-related processing during the rendering of the synthetic SDOF effects described herein. Turning now to FIG. 1C, a set of exemplary tile sub-regions (e.g., tile 184) created over a sample image 100, i.e., an image to which synthetic SDOF effects are desired to be applied, is shown, according to one or more embodiments. Tiles, as used herein, simply refers to small areas of the overall image, which may serve as, e.g., work groups of pixels that a GPU can process in parallel. In some embodiments, the image tiles may comprise 8 pixel by 8 pixel square regions, though these dimensions are not strictly necessary. The processing of identified tile regions will be described in further detail below under the Highlight Recovery heading.

Gating Process

According to some embodiments, a global gating process may be applied to a captured image, e.g., to determine whether or not highlight recovery and boosting techniques should be applied to the captured image and, if so, at what strength the highlight recovery and boosting techniques should be applied. In some embodiments, the gating process may be run earlier in the camera pipeline, i.e., before the main rendering stage of the pipeline, as will be described in greater detail below. In such cases, the outcome of the gating algorithm may advantageously be stored in the metadata that is embedded in the original (i.e., non SDOF) captured image, e.g., in the form of tuning parameters that may be used to control or modify various aspects of the rendering process when reapplied to the image.

According to some embodiments, the gating algorithm may operate by counting the number of clipped pixels that belong to the image's background. In some embodiments, the determination of whether a given pixel belongs to the image's background may be made based, at least in part, upon the given pixel's value in the image's corresponding estimated depth/disparity/blur information. For example, in the case of a blur map that stores blur radii for each pixel in the captured image, assuming the camera is focused to the scene's foreground, a large blur radius generally signifies that a pixel belongs to the image's background, whereas a small blur radius generally signifies that a pixel belongs to the image's foreground. According to some embodiments, a soft-threshold, e.g., in the form of a smoothstep function, may be used to determine the likelihood that a given pixel belongs to the image's background, i.e., based on its blur radius in the blur map. In other embodiments, the disparity or depth of a pixel could be used directly, if it is known or available.

Once it has been determined that a pixel is sufficiently likely to be part of the image's background, the gating process may next attempt to determine whether the pixel is a clipped pixel (e.g., representative of a very bright background light source that saturated the image sensor, such as a point light source). According to some embodiments, to determine whether a given pixel is clipped (or, conversely, to determine whether the given pixel is unclipped, depending on the design of a given implementation), the product of two soft thresholds (e.g., in the form of smoothstep functions) may be computed, where the determination of the output value is based, at least in part, on the maximum and minimum values of the component intensities for the given pixel. (The component intensity values for a given pixel may, e.g., reflect the light intensity values recorded by an image sensor for one or more channels associated with the given pixel, such as a red color channel intensity value, a green color channel intensity value, and a blue color channel intensity value, in the case of RGB pixel image data.)

For example, according to some embodiments, the degree to which a given pixel is unclipped, $W_{unclipped}$, may be calculated according to the following Equations:

$$W_{unclipped} = \max(1 - W_{blur}, W_{min1}, W_{max1}, \varepsilon) \quad \text{(Eqn. 1)},$$

$$\text{wherein } W_{blur} = \text{smoothstep}(T_{blur1}, T_{blur2}, r) \quad \text{(Eqn. 2)},$$

$$W_{min1} = \text{smoothstep}(T_{min1}, T_{min2}, \min(R, G, B)) \quad \text{(Eqn. 3)},$$

$$W_{max1} = \text{smoothstep}(T_{max1}, T_{max2}, \max(R, G, B)) \quad \text{(Eqn. 4)},$$

the various $T_1$ and $T_2$ values represent minimum and maximum thresholds for the various smoothstep functions, respectively, r is the blur radius of the pixel being tested, and $\varepsilon$ is a small factor to avoid potential numerical instability (e.g., divide by zero errors). As will be described later, the greater the value of $W_{unclipped}$ is for a given pixel, the more reliable its value may be for attempting to recover the color and light information of clipped highlight pixels in the image. It is to be understood that the inverse of the unclipped weight, i.e., $1-W_{unclipped}$, would represent an estimate of the degree to which a given pixel is clipped, e.g., $W_{clipped}$. Either such measure may be used, based on the design of a given implementation.

The soft thresholds used in Eqns. 1-4 above are based on the insight that the maximum component intensity value for a clipped pixel is expected to be very close to the clipping point (i.e., 100% intensity values, or 255, in the case of 8-bit data). Further, a higher intensity value for the minimum component of a pixel also indicates that the pixel is much more likely to be clipped (e.g., 50% or higher intensity values, or values of 128 and higher, in the case of 8-bit data). Thus, according to some embodiments, the final "clipped background pixel" score (also referred to above as $W_{unclipped}$ or $W_{clipped}$, depending on which convention is preferred by a given implementation) for a given pixel is calculated from the product of the background/blur, maximum, and minimum component soft-thresholds, as shown in Eqn. 1, above. If the resulting product is non-zero (i.e., each of the components exceeded the lower threshold of its respective smoothstep function), then the pixel may be considered to be (at least partially) clipped. Using this process, an unclipped background pixel score, e.g., $W_{unclipped}$ (or, if preferred, a clipped background pixel score, $W_{clipped}$) may be calculated for all pixels in the image, as well as a corresponding count of the number of pixels that are determined to be clipped background pixels.

Next, a simple exposure score for the image may be calculated, e.g., by multiplying the image sensor's gain by the exposure integration time for the captured image (which simple exposure score may also be referred to herein as the "EIT"). As may be appreciated, a high exposure score indicates a low light level when the image was captured, and a low exposure score indicates a high light level when the image was captured. According to some embodiments, by applying another soft threshold (or other desired form of threshold) to the percentage of clipped background pixels and the exposure score, and then taking the product of said soft-thresholded clipped background pixels percentage and exposure score, a global highlight recovery/boosting score for the image may be determined.

A global highlight recovery/boosting score value of zero would indicate that no highlight recovery or boosting should be performed on the current image (e.g., perhaps due to their being too many pixels that are estimated to be clipped background pixels), while a value of one would indicate that full-strength highlight recovery and boosting should be applied to the image. As will be explained in greater detail below in the Highlight Recovery section, in some embodiments, the number of highlight recovery iterations performed on the image before the highlight boosting process may be determined by linearly scaling the maximum number of iterations by the calculated global highlight recovery/boosting strength score.

As will also be explained in greater detail below in the Highlight Boosting section, highlight boosting weight gain ($W_{boost}$) and highlight boosting intensity gain ($G_{boost}$) parameters may also be calculated for individual sampled pixels, e.g., based on a scaling of a local highlight boosting strength score.

Highlight Recovery

Returning now to FIG. 1C, a set of exemplary tiles has been created over the image 100. As explained above, in some embodiments, only those tiles that have been determined to contain at least one clipped background pixel need to be processed further to recover lost highlight information. In most images, only a small proportion of the background image pixels will be clipped (e.g., typically less than 10%), so it may be advantageous to identify those regions early in the processing pipeline, so as to avoid unnecessary processing cycles.

In the example shown in FIG. 1C, only the tiles 180 (shown as outlined in bold black lines) have been determined to contain clipped background pixels. As may be understood, the pixels in these tiles correspond to the various clipped background point light sources 140 in image 100, previously described in the context of FIGS. 1A and 1B. Other tiles, e.g., the tile labeled 184, may be in the background of the image (e.g., in the sky), but may not reflect sufficiently clipped pixel values (e.g., may be pixels representing a night sky). Other tiles in the image, e.g., representing specular reflections in the whites or pupils of the human subject's eyes 186, may have sufficiently clipped pixel values, but may not be deemed to be in the background of the image.

Thus, in some embodiments, the first stage of a highlight recovery process may be to perform a scan of the image and constructing a tile processing list (e.g., as represented graphically by tile processing list 185 shown in FIG. 1C) that contains the positions of the tiles that need to be processed for highlight recovery. As shown in FIG. 1C, the tile processing list 185 contains only those tiles that include pixels corresponding to the various clipped background point light sources 140, which represent only a small fraction of the total number of tiles in image 100. One four-tile region in particular, region 182, corresponding to one of the point light sources in image 100 has been enlarged in FIG. 1C for explanatory purposes. As shown, region 182 consists of four individual tiles 190, each consisting of a set of 64 pixels laid out in an 8 pixel by 8 pixel square. As may now be understood, each tile making up region 182 contains at least one pixel corresponding to the circular disc of a clipped background point light source, thereby causing each such tile to be added to the tile processing list 185.

According to some embodiments, the second stage of the highlight recovery process may proceed to diffuse non-clipped pixel color values (e.g., pixels lying outside the point light source regions) into neighboring regions of clipped pixel values (e.g., pixels lying within the point light source regions). This process of diffusion may be carried out using any desired form of filter, e.g., a 3×3 weighted average filter (such as is shown by filter window 192 in FIG. 1C), where the weight for each input pixel in the filter is determined by how clipped the respective pixel is (e.g., a completely clipped input pixel in the filter may get a weight of 0, since it would not add reliable color information to the output pixel 194; while a non-clipped input pixel in the filter may get a weight of 1, since its color information would be much more reliable—and potentially indicative of true, i.e., non-clipped, color of the output pixel 194, had the image sensor been able to capture its true value). According to some embodiments, the extent to which a pixel is clipped may be determined using the same criteria discussed with regard to the gating algorithm above and Eqns. 1-4.

The calculated weighted average for the output pixel 194 (i.e., the center pixel of the filter) may then be blended with the previous value for the pixel according to its clipping score, where, e.g., a non-clipped pixel will remain at its previous value, and a completely clipped pixel will be completely replaced by the weighted average calculated from the diffuse filtering process, in order to generate an updated value (or set of updated component intensity values) for the output pixel 194.

As many of the tiles in the processing list are likely to be spatially adjacent, the blended weighted average results from one tile would, if not accounted for, affect the new blended weighting averages of those surrounding tiles. In order to achieve correct results, the input image should remain constant during each diffusion iteration. Therefore, the resulting blended pixel values may be written to a temporary holding texture. Then, once the highlight recovery iteration has been computed for all tiles in the processing list 185, the resulting blended pixel values may be copied from the temporary holding texture back to the "working texture," i.e., the actual image data that is being updated with the recovered highlight information. According to some embodiments, the highlight recovery process may repeated for N iterations, wherein the number, N, may be based on the global highlight recovery/boosting score, with a higher score resulting in more iterations of highlight recovery, and a lower score resulting in fewer iterations of highlight recovery. According to some embodiments, the chosen diffusion filter may be such that each iteration of the highlight recovery process spreads the non-clipped pixel values one pixel further into clipped regions.

Highlight Boosting

According to some embodiments, in addition to recovering highlights in regions of the image deemed to be clipped background pixels, such pixels may also intentionally be boosted (and even clipped) again to give a more realistic appearance of a "glowing" or "light emitting" background light source of an appropriate color (i.e., as opposed to a dimmer, reflective light source).

As will be explained in more detail below, according to some embodiments, the SDOF rendering process may involve a sparse sampling process, wherein a number of pixels surrounding each pixel in the output image are sampled, and wherein the value of each pixel in the output image is computed based on a weighted combination of various characteristics of the sampled pixels. In particular, in order to more accurately render clipped highlight pixels in the synthesized SDOF image, the contribution weight of a sampled pixel and the sampled pixel's color value may each be further modified, e.g., according to a boosting score. According to some embodiments, the boosting score may be multiplied by a pair of gain coefficients (referred to herein as a weight gain coefficient and an intensity gain coefficient), which may be determined, at least in part, by the gating stage above, e.g., by multiplying the global highlight recovery/boosting score for the image by a pair of tuning constants, such as a constant representative of the maximum highlight boosting gain weight and a constant representative of the maximum highlight boosting intensity gain. More particularly, in some embodiments described herein, both a weighting term and an intensity gain term may be applied to sample pixels deemed to represent background highlights in the highlight boosting process, with the goal of creating a more realistic or natural-looking background highlight in the rendered synthetic SDOF image, e.g., which appears to glow or emit a bright light of an appropriate color.

Image Processing Pipeline: Capture Stage

Figure 2A:
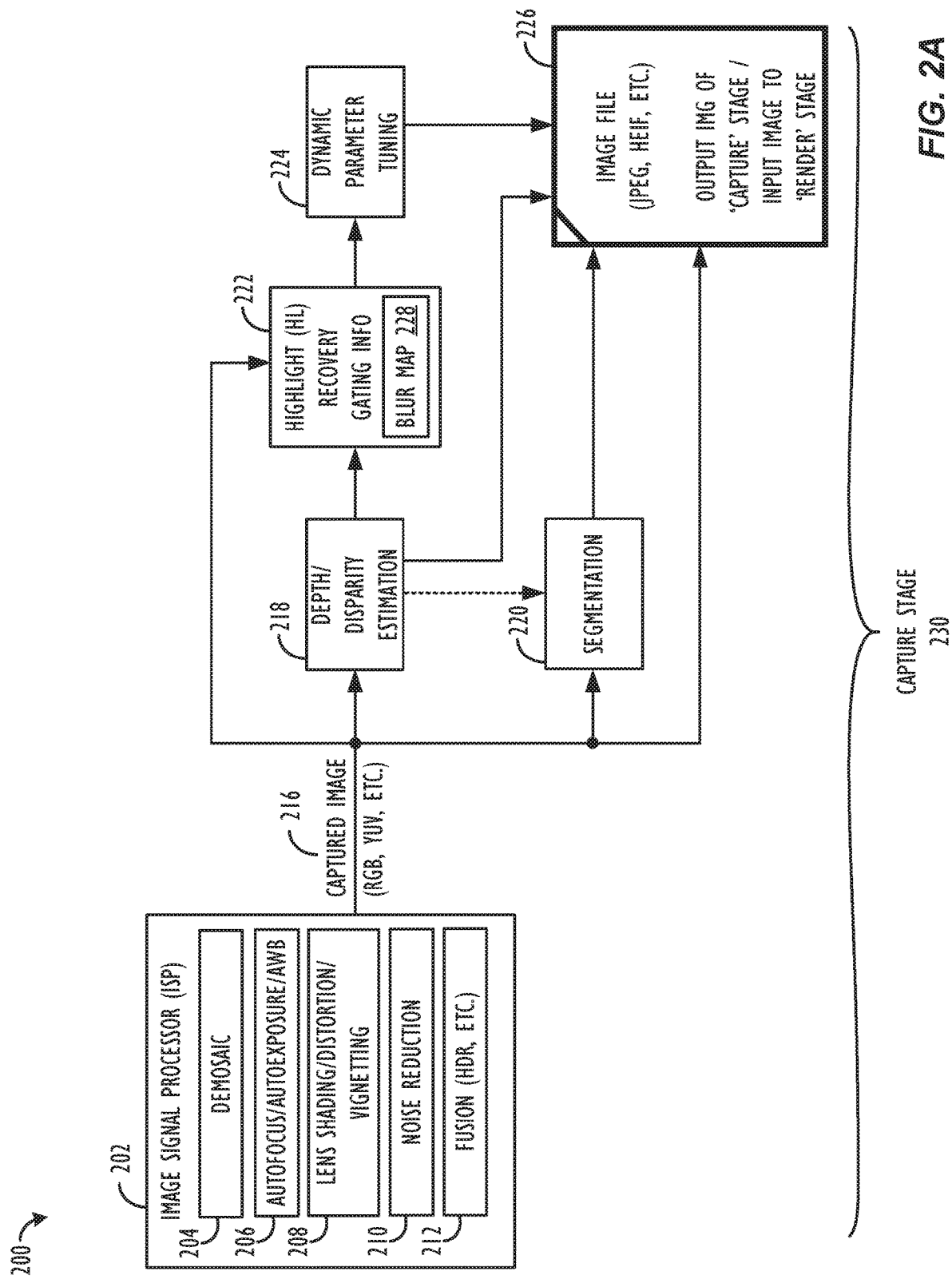
FIG. 2A is a portion of an exemplary image processing pipeline for the capture and preparation of images to which synthetic SDOF effects are desired to be applied, according to one or more embodiments.

Turning now to FIG. 2A, a portion of an exemplary image processing pipeline 200 for the capture and preparation of images to which synthetic SDOF effects are desired to be applied is shown, according to one or more embodiments. In particular, FIG. 2A details portions of the image processing pipeline that are referred to herein as being part of a "capture stage" 230. In other words, the portions of the image processing pipeline 200 illustrated in FIG. 2A are typically configured to occur at capture time (or subsequently thereafter), i.e., in an image signal processor or related firmware or software. The portions of the image processing pipeline 200 illustrated in FIG. 2A are typically unaffected by changes or alterations that a user may later apply when editing the image in post-processing software and/or rendering post-processing effects to the captured image, e.g., the synthetic SDOF effects described herein.

According to some embodiments, the image signal processor (ISP) 202 is a specialized hardware processor designed to perform and facilitate many tasks related to image processing. The ISP may be implemented as a System-on-Chip (SoC) or as a discrete processing unit. Among the various tasks than an ISP may perform on the data captured by an image sensor are: demosaicing 204; autofocus (AF), auto exposure (AE), and/or auto white balancing (AWB) 206; lens shading, distortion correction and vignetting correction 208; noise reduction 210); and various forms of image fusion (e.g., related to high dynamic range (HDR) imaging or image stabilization (IS)) 212. The ISP or SoC may also implement various compression and/or encoding techniques on the captured image, depending on a given implementation.

The output of the ISP 202 is a captured image 216, which may be encoded in a desired pixel encoding format (e.g., RGB, YUV, etc.). According to some embodiments, depth and/or disparity estimates 218 may be obtained for the captured image 216, e.g., via the use of defocus information, phase detection pixels, or other desired modalities. According to some embodiments, semantic segmentation information 220 may also be obtained for captured image 216, e.g., in the form of a segmentation mask providing a per-pixel classification of pixels in the image (such as 'foreground' vs. 'background,' or 'person' vs. 'non-person,' etc.). Of course, multiple classes may be segmented for in a given segmentation mask, and the classification values within a given segmentation mask may comprise binary values or continuous value, e.g., values reflecting the relative probabilities that a pixel belongs to a particular segmented class. In some cases, as indicated by the dashed line arrow in FIG. 2A, the depth and/or disparity estimates 218 may be used to further refine the semantic segmentation information 220.

In some embodiments, the depth and/or disparity estimates 218 may take the form of (or be converted into the form of) a blur map, i.e., a two-dimensional array of blur values, wherein each blur value represents a radius, diameter (or other size-indicative parameter) of the blurring "circle of confusion" of the corresponding pixel in the captured image 216. As described above, e.g., in the Gating Process section, in some embodiments, a gating process may be executed on the captured image 216 to develop highlight (HL) recovery gating information 222 for the captured image 216. As explained above, the highlight recovery gating information 222 may take the form of a global indication of whether or not highlight recovery should be performed on the image if subjected to a subsequent synthetic SDOF rendering process and, if so, what degree or strength of highlight recovery and/or boosting should be performed on the captured image 216. In some embodiments, generating the gating information 222 may also comprise the creation of a blur map 228 for the captured image, e.g., based on the depth/disparity information 218. As will be explained in greater detail below, a blur map 228 may also be generated from the captured image's depth/disparity information (or otherwise obtained) during the rendering stage of the SDOF image.

Finally, one or more tuning parameters 224, which may comprise, e.g., dynamically-tunable parameters, may be obtained or determined based on the captured image 216 and/or the capture conditions for captured image 216. Parameters 224 may be used to affect the application of one or more effects that may be applied to the captured image 216, e.g., in a post-processing or editing operation. For example, depending on the desired resolution of the rendered SDOF image (which may or may not be the same as the captured image 216), various parameters related to the SDOF rendering process, e.g., the strength of highlight recovery to be applied to the image, may be tuned or adjusted, such that the resulting SDOF would look perceptually accurate to a viewer, despite the potential difference in resolution of the rendered SDOF image. Other exemplary tuning parameters 224 may include, e.g., estimates of scene illumination sources (e.g., a scene illumination map), confidence maps for disparity/blur/alpha/segmentation operations, image noise levels, etc.

Figure 2B:
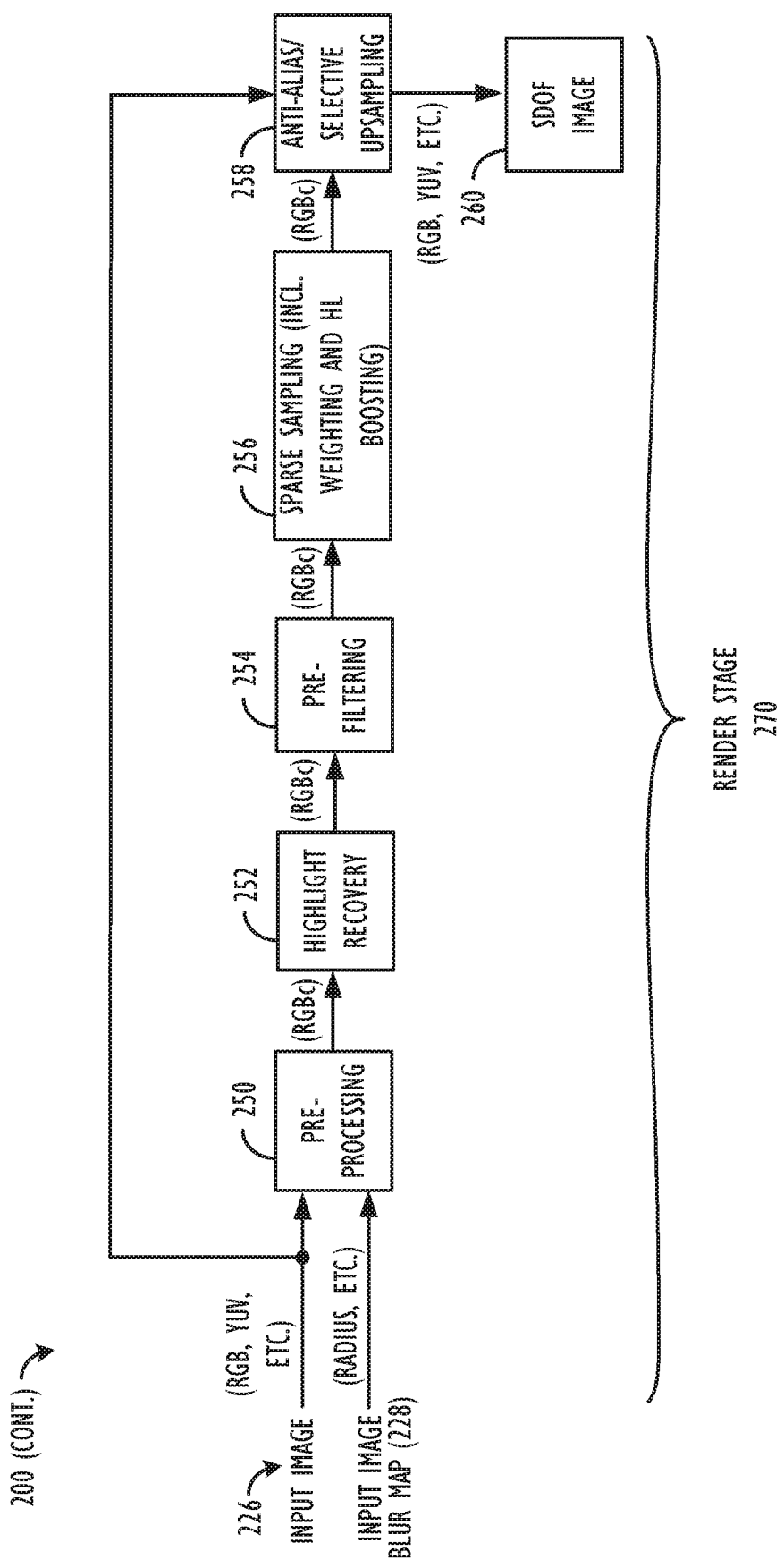
FIG. 2B is a portion of an exemplary image processing pipeline for the rendering of synthesized SDOF effects, according to one or more embodiments.

Finally, one or more of the aforementioned sources of information, e.g., depth and/or disparity estimates 218, semantic segmentation information 220, highlight recovery gating information 222, and dynamically-tuned parameters 224 may be stored, along with the captured image 216, e.g., in the form of metadata information, as image 226, which may be thought of as the output image of the capture stage 230 of the image processing pipeline and/or the input image to the render stage of the image processing pipeline, which will be discussed in greater detail with reference to FIG. 2B. Image 226 may comprise, e.g., an image in the JPEG format, HEIF format, or other desired image format.

Image Processing Pipeline: Render Stage

Turning now to FIG. 2B, a portion of the exemplary image processing pipeline 200 for the rendering of synthesized SDOF effects is illustrated, according to one or more embodiments. In particular, FIG. 2B describes elements of a render stage 270 of the image processing pipeline 200, wherein the information created by the capture stage 230, described above with reference to FIG. 2A, may be utilized, e.g., in the rendering of a synthetic SDOF image.

As shown in FIG. 2B, the render stage 270 of image processing pipeline 200 may begin with the aforementioned inputs, such as: input image 226 (which was described above as being conceptually both the output image of the capture stage 230 and the input image to the render stage 270) and the input image blur map 228, which may be, e.g., stored in (or derivable, e.g., in conjunction with the use of a Simple Lens model, from information stored in) the input image 226. As mentioned above, the input image 226 may be in one of several possible color spaces. For example, RGB color spaces, such as sRGB and DCI-P3, or YUV color spaces, such as BT.601 and BT.709, are popular color spaces that image color data may be captured in. As also described above, the blur map 228 may comprise a two-dimensional array of blur values, wherein each blur value represents a size-indicative parameter relating to the blurring "circle of confusion" of the corresponding pixel in the captured image, e.g., pixels that are predicted or desired to be more out of focus in the resultant synthesized image will have large values in the blur map, and pixels that are predicted or desired to be more in focus in the resultant synthesized image will have small values, e.g., zero, in the blur map.

Next, one or more pre-processing operations (250) may be performed on the image, e.g., to convert the image into a desired pixel encoding format, include the corresponding information from the blur map 228 with the color data for each individual pixel, and/or downsample the color image and blur map image. This pixel encoding format will be represented as "RGBc" herein and in FIG. 2B, for the sake of this example, wherein 'R' refers to the red color channel, 'G' refers to the green color channel, 'B' refers to the blue color channel, and 'c' refers to the radius of the circle of confusion, i.e., the "blur radius," for the pixel.

At this stage in the image processing pipeline, the aforementioned highlight recovery techniques (252) may be performed, e.g., to attempt to recover color and/or light information for clipped background highlight pixels based on the color and/or light information neighboring, non-clipped pixels.

Next, pre-filtering operations (254) may be performed on the input image. In some embodiments, pre-filtering operations 254 may involve a process similar to anti-aliasing, but wherein a blur kernel, e.g., a Gaussian blur kernel using a relatively small and/or varying sigma (i.e., standard deviation) value, may be applied over the pre-processed input image, e.g., in order to spread out small point light sources. Intentionally spreading small point light sources in the pre-filtering operations may help to reduce the amount of grain that will be present in any bokeh circles that are synthesized as a result of any such small highlight areas. In some embodiments, pre-filtering operation 254 may also apply highlight boosting operations (e.g., similar to or the same as those described herein) in order to boost the weight of highlight pixels that are included in a filtering window of a pre-filtering blur kernel used to perform the aforementioned pre-filtering operations.

Next, sparse sampling operations may be performed in the neighborhood of pixels surrounding each image pixel (256). As will be described in greater detail below, rather than spreading the light of each pixel onto all other pixels within the blurring radius and accumulating the results, the process may sparsely sample, that is, select, some number of pixels in the surrounding neighborhood of input image pixels (e.g., using a randomized distribution) and then gather and weight the light and/or color information from such neighboring pixels to adjust the output value on the input pixel based on the accumulated gathered information. According to some embodiments, the process may approximate the SDOF effects by weighting the light and/or color information values from each sparsely sampled neighborhood pixel, e.g., based on a determination of how prominent each such neighborhood pixel should be in the output synthetic SDOF image and/or the degree to which such neighborhood pixel represents a clipped background highlight pixel.

After the updated values of the pixels in the output image have been found based on the determined weighted contributions of the sparsely sampled neighborhood pixels, an anti-aliasing process (258) may be performed on the output image data to account for any undesirable noise that may have been caused, e.g., by the sparseness of the sampling. The anti-aliasing process (258) may be thought of as a type of variable smoothing operation where the level of smoothing/blurring may be determined by each pixel's blur radius. Finally, if desired, the anti-aliased color pixel information may be selectively up-sampled and combined with the original input image (226), then converted back into the desired pixel encoding format, e.g., RGB or YUV, for the output synthetic SDOF image (260).

Figure 3:
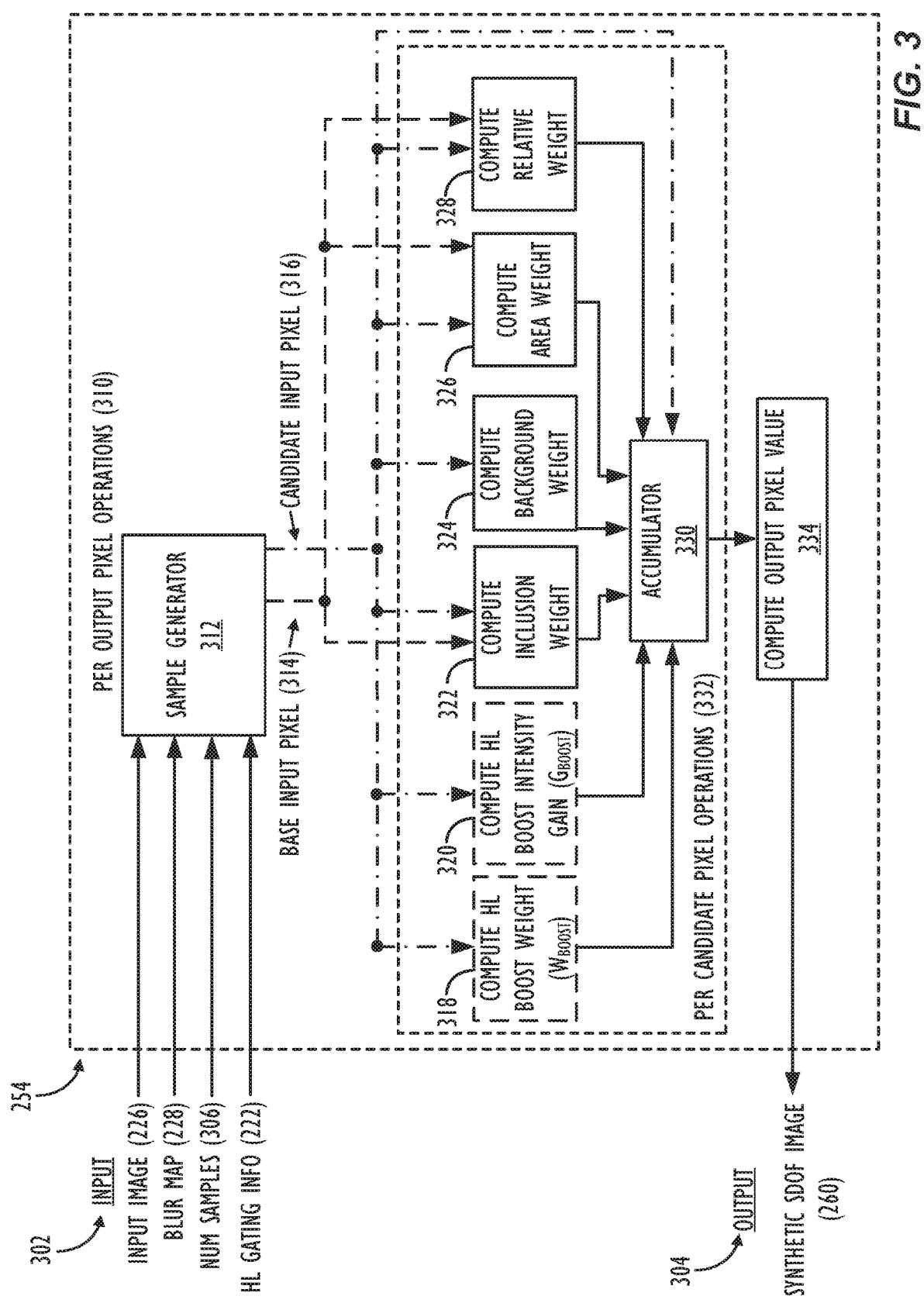
FIG. 3 is a block diagram giving more detail to sparse sampling and weighting processes that may be employed in an exemplary image processing pipeline for synthesizing SDOF effects, according to one or more embodiments.

Turning now to FIG. 3, a block diagram giving more detail to the sparse sampling and weighting process 256 from FIG. 2B is illustrated, according to one or more embodiments. As discussed above, the inputs (302) to the sparse sampling and weighting process 256 may comprise, e.g.: the input image (226); the corresponding blur map (228), which may, e.g., specify the blur radius for all pixels in the input image; a number of pixel samples (306) to be used in the plurality of candidate pixels surrounding a given input image pixel during the aforementioned sparse sampling process; and the highlight gating information (222) obtained from the gating process (which may, e.g., be stored with the input image in the form of one or more tuning parameters), described above.

Next, the sampling and weighting operations that are performed per output pixel (310) will be discussed in greater detail. As used herein, the term "output" pixel refers to a pixel which will be represented in the output synthetic SDOF image. Each output pixel may be thought of as having a corresponding base "input" pixel at the same location in the input image (226). First, one or more random or pseudo-random number sample generators (312) may be used to generate a number of randomly-distributed sample positions equal to the number of pixel samples (306) value that was obtained as part of the input configuration. Due to the sparse nature of the sampling, any input image with structured high frequency content has the risk of producing unwanted aliasing artifacts in the sampled output image, which may be seen as banding or concentric circular patterns. Thus, it may be important to be sensitive to high frequency information in images, e.g., by sampling in a non-regular pattern. In some embodiments, e.g., as will be described in greater detail with reference to FIG. 6 below, this effect may be achieved by sampling in a per-pixel uniformly-distributed random pattern, resulting in any aliasing artifacts being spatially non-correlated.

According to some embodiments, the randomly-generated distribution of samples may need to be specially configured, re-shaped, and/or weight-compensated for non-uniformity, e.g., to provide more equally-distributed coverage of the sampling region. According to other embodiments, predetermined irregular patterns of sampling distributions may also be employed, e.g., if it is not desirable to create a new random distribution of sample positions for each processed image. Once the sample generator (312) has the final set of random samples that will be used as the "candidate pixels" for the present input pixel, the process may move on to the so-called per-candidate pixel operations (332).

According to some embodiments, one or more weights may be computed based on one or more characteristics of each candidate input pixel (316) with respect to the present base input pixel (314), i.e., the pixel in the input image that is at the same location as the output pixel currently being calculated. Computations of each of the following exemplary weights will now be discussed in greater detail: Highlight Boosting weight gain (318); Highlight Boosting intensity gain (320); inclusion weight (322); background weight (324); area weight (326); and relative weight (328). As will be appreciated, each of these weighting values may aid in providing a more natural-looking synthesized SDOF effect in the resultant synthesized SDOF image, and each will now be described in greater detail below.

Highlight Boosting Weight Gain

The computation of Highlight Boosting weight gain (318) is designed to control the degree to which a candidate pixel's color or light intensity value should be included in the blurring calculation for a present output pixel, based on the degree to which the candidate pixel's light intensity color components and blur radius value from the blur map are representative of the candidate pixel being a clipped background highlight pixel.

According to some embodiments, a boosting score for a given sampled pixel may be determined by estimating the intensity of sampled pixel, e.g., based on the maximum of its color component values. The intensity of the maximum color component value may then be raised by a large exponent value, in order to give a highly non-linear response, e.g., where values that are not close to clipped (i.e., 100% intensity values, values of 1.0 on a normalized pixel intensity scale, or a value of 255 in an 8-bit system, etc.) will have a near-zero result. The resulting value of the exponential operation may then be multiplied by a soft thresholded value of the blur value to get the final boost score, such that only pixels with a blur-radius indicative of background will be boosted.

More particularly, according to some embodiments, the highlight recovery/boosting score ($S_{boost}$) may be determined for a given sampled pixel as shown in the following equation:

$$S_{boost} = \text{smoothstep}(k_{b0}, k_{b1}, I_{blur}(x+i, y+j))\cdot{}_z^{max}(I(x+i, y+j, z))^{k_{be}}, \quad \text{(Eqn. 5)}$$

wherein $k_{b0}$ is a predefined lower threshold, $k_{b1}$ is a predefined upper threshold, $k_{be}$ is the aforementioned large exponent value, $I_{blur}(x+i, y+j)$ is the sampled pixel's value in the blur map, $\max_z(I(x+i, y+j, z))$ refers to the maximum value of the color channels of the sampled pixel, and the smoothstep function may be defined as:

$$\text{smoothstep}(T_0, T_1, x) = \left(\frac{x - T_0}{T_1 - T_0}\right)^2 \cdot \left(3 - 2\frac{x - T_0}{T_1 - T_0}\right)$$

when $T_0 < x < T_1$; 0 when $x \leq T_0$; and 1 when $x \geq T_1$ (Eqn. 6), wherein $T_0$ refers to a lower threshold of the smoothstep function, $T_1$ refers to the upper threshold of the smoothstep function, and x in Eqn. 6 refers to the smoothstep function itself. The exemplary polynomial equation shown in Eqn. 6 above is but one example of a smooth step function that may be used to interpolate between the values of $T_0$ and $T_1$.

According to some embodiments, the aforementioned highlight recovery/boosting score, $S_{boost}$, may then be used to calculate the Highlight Boosting weight gain (318), $W_{boost}$, e.g., according to the following equation:

$$W_{boost} = 1 + k_{hbwg} S_{boost} \quad \text{(Eqn. 7),}$$

wherein $k_{hbwg}$ is a highlight boosting weight gain coefficient that may be predetermined or determined based on one or more image characteristics.

Highlight Boosting Intensity Gain

The computation of Highlight Boosting intensity gain (320) is designed to control the degree to which a candidate pixel's color or light intensity value should be boosted (i.e., increased) in the blurring calculation for a present output pixel, based on how indicative the candidate pixel's light intensity color components and blur radius value from the blur map are of the candidate pixel being a clipped background highlight pixel.

According to some embodiments, the aforementioned highlight recovery/boosting score, $S_{boost}$, may also be used to calculate the Highlight Boosting intensity gain (320), $G_{boost}$, e.g., according to the following equation:

$$G_{boost} = 1 + k_{hbig} S_{boost} \quad \text{(Eqn. 8),}$$

wherein $k_{hbig}$ is a highlight boosting intensity gain coefficient that may be predetermined or determined based on one or more image characteristics.

In some cases, as will be illustrated in greater detail with reference to FIG. 7, the exponential function used to determine the highlight recovery/boosting score ($S_{boost}$) may be designed such that only pixels having one or more color components that are quite close to clipping (e.g., 240 or greater, in an 8-bit system; or 0.95 or greater on a scale of component values normalized from 0 to 1) are affected by the boosting, but that, pixels that are affected by the boosting are affected very aggressively (e.g., given a weighting boost of 2x-12x), to attempt to more accurately reflect the actual likely brightness of the point light source that caused the image sensor to clip, including causing the boosted pixels to clip again in the resultant synthetic SDOF image.

Inclusion Weight

The computation of inclusion weight (322) is designed to control the degree to which a candidate pixel's color or light intensity value should be included in the blurring calculation for a present output pixel if the candidate pixel's light intensity (based, e.g., on its blur radius value from the blurring map) would reach the present output pixel. In one embodiment, the inclusion weight could be a binary value, e.g., a weight of '0' if the candidate pixel's light does not affect the present output pixel (i.e., if the candidate pixel's blur radius would not encompass the present output pixel) or a weight of '1' if pixel does affect the present output pixel (i.e., if the candidate pixel's blur radius would encompass the present output pixel).

Figure 4:
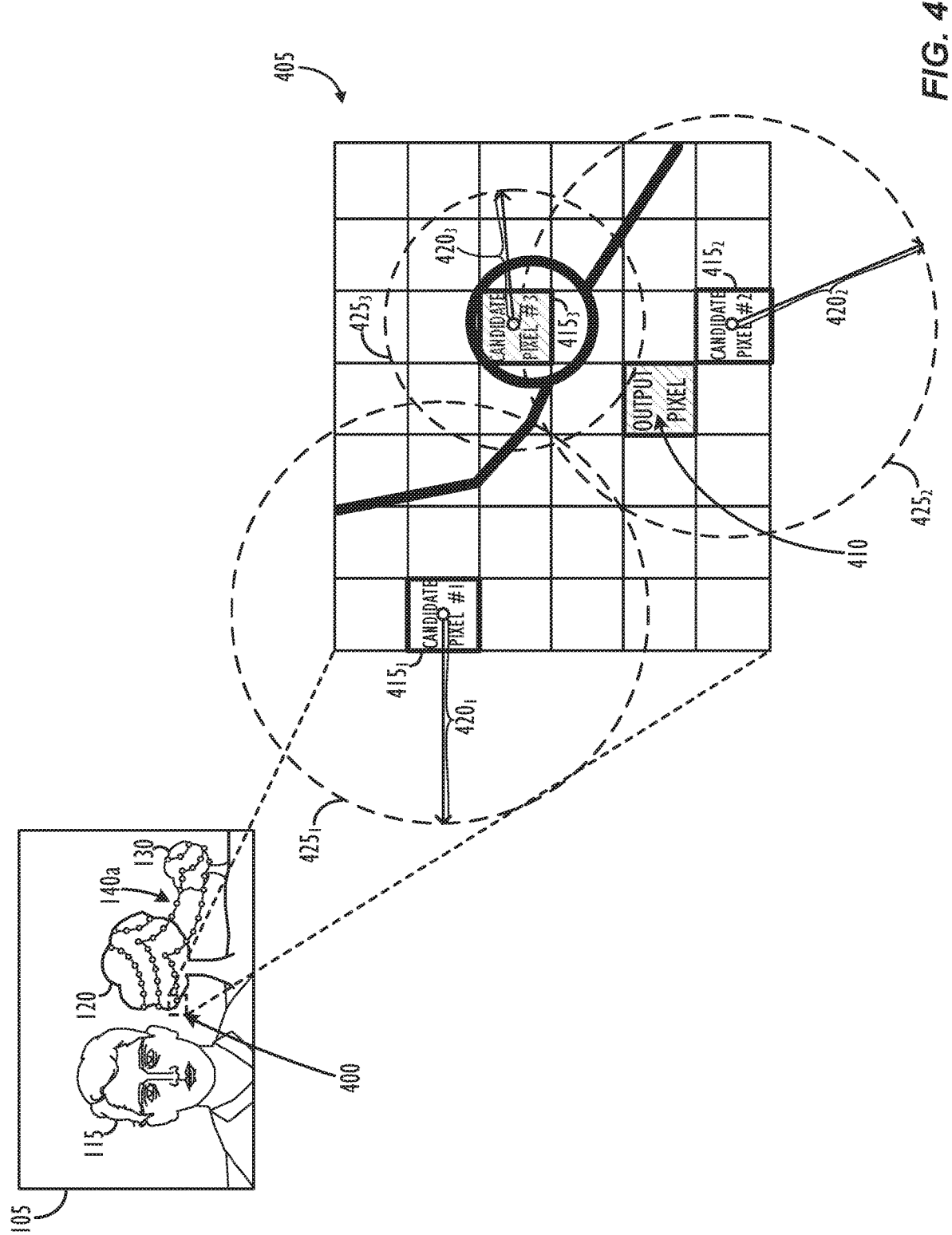
FIG. 4 illustrates an example of a generated plurality of candidate pixels for a particular output pixel, according to one or more embodiments.

Turning now to FIG. 4, an example of a generated plurality of candidate pixels 415 for a particular output pixel 410 is illustrated, according to one or more embodiments. Region 400 from image 105 has been magnified into region 405 for explanatory purposes here so that individual exemplary pixels may be seen. As shown in FIG. 4, candidate pixel 1 ($415_1$) has a blur radius of $420_1$, resulting in a blurring circle $425_1$ that does not intersect or encompass the output pixel 410. Thus, in the simple binary example discussed above, candidate pixel 1 ($415_1$) would receive an inclusion weight of 0, since its light would not affect the SDOF blurring of output pixel 410. Candidate pixel 2 ($415_2$), by contrast, has a blur radius of $420_2$, resulting in a blurring circle 4252 that does encompass the output pixel 410. Thus, in the simple binary example discussed above, candidate pixel 2 ($415_2$) would receive an inclusion weight of 1, since its light would affect the SDOF blurring of output pixel 410. Likewise, in the example of FIG. 4, candidate pixel 3 ($415_3$) has a blur radius of $420_3$, resulting in a blurring circle $425_3$ that does encompass the output pixel 410. Thus, in the simple binary example discussed above, candidate pixel 3 ($415_3$) would also receive an inclusion weight of 1, since its light would be very likely to affect the SDOF blurring of output pixel 410 in a SDOF synthesis operation.

Figure 5:
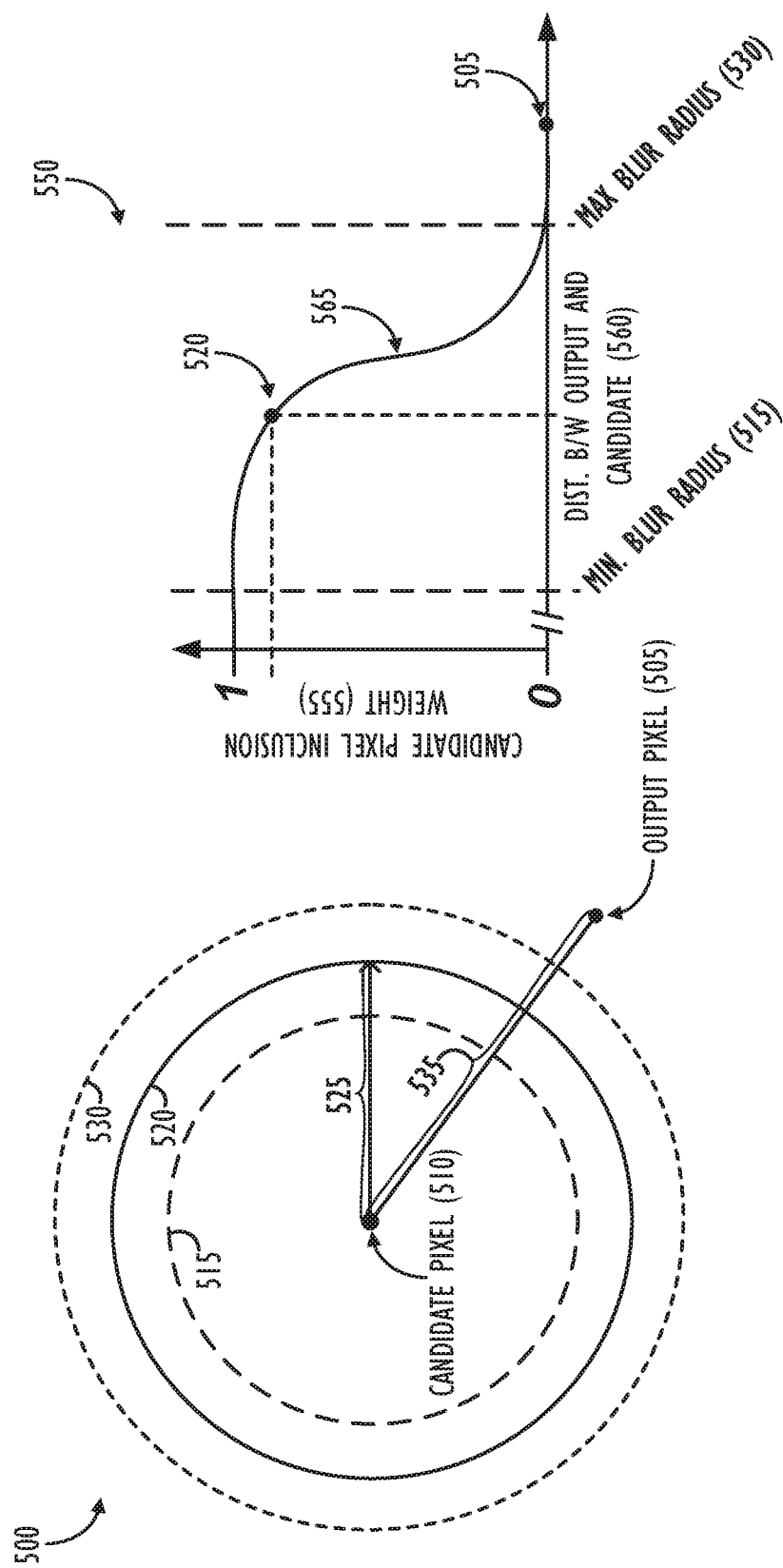
FIG. 5 illustrates an exemplary inclusion weighting function, according to one or more embodiments.

Turning now to FIG. 5, an exemplary inclusion weighting function 565 is illustrated, according to one or more embodiments. According to such embodiments, rather than having just a binary inclusion weight scheme of values 0 or 1, a tunable threshold may be used, wherein the weight value assigned to a pixel may taper off gradually as the distance between the candidate pixel and the present output pixel increases, until finally dropping to zero past a maximum blur radius.

The various tunable thresholds of inclusion weighting function 565 are further illustrated in example 500 of FIG. 5. In particular, the present output pixel 505 is represented as being a distance of radius 535 away from candidate pixel 510. In this example the output pixel 505 is represented as being outside both the minimum blur radius circle 515 and the maximum blur radius circle 530. Thus, as shown on the graph 550, which plots candidate pixel inclusion weight 555 on the y-axis and distance between present output pixel and candidate pixel 560 on the x-axis, the illustrated candidate pixel 510 and output pixel 505 pairing would be assigned an inclusion weight of 0, since the candidate pixel 510 is so far away from the output pixel, i.e., a distance of 535, that its actual blur circle 520, having blur radius 525, does not encompass or intersect the output pixel 505, thus providing an indication that the light energy from candidate pixel 510 should not influence the blurring result of the output pixel 505. As further illustrated in graph 550, if the output pixel 505 had instead been located along blur circle 520, i.e., at a distance of 525, the candidate pixel 510 would have been assigned a value fairly close to 1, as indicated by the meeting of the dashed lines in graph 550 at point 520. According to the weighting function 565, any time a candidate pixel and output pixel are closer to each other than the minimum blur radius circle 515, the pixel will be assigned an inclusion weight of '1'. Likewise, any time a candidate pixel and output pixel are farther away from each other than the maximum blur radius circle 530, the pixel will be assigned an inclusion weight of '0'. As may now be understood, any number of weighting functions 565 may be used for a given implementation based, e.g., on how 'binary' or 'tunable' of an inclusion weighting assignment scheme is desired for the given implementation.

According to some embodiments, the inclusion weight may be further extended to handle non-circular blurring shapes, as well as blurring shapes that may vary across the image plane. For example, according to some embodiments, to model the physics of a larger aperture camera, it may be desirable to use non-circular blurring shapes that are aligned towards the center of the image. To achieve this, according to some embodiments, an output pixel may first be projected onto the coordinate space of the sampled candidate pixel's shape. This may be achieved by normalizing the candidate pixel's offset by its blur radius and applying a rotation matrix, R (which may be, e.g., a 2×2 rotation matrix), to rotate a defined u-v coordinate system, such that the u-axis is aligned towards the image center (e.g., for ease of computation of the subsequent inclusion determination). According to some embodiments, this rotation may be achieved via the following equation:

$$\begin{bmatrix} u \\ v \end{bmatrix} = \frac{R}{I_{blur}(x+i, y+j)} \begin{bmatrix} i \\ j \end{bmatrix},$$ (Eqn. 9)

wherein (i,j) represents the coordinate offsets of the given candidate pixel with respect to the output pixel and $I_{blur}(x+i, y+j)$ represents the given candidate pixel's value in the blur map.

The distance between the projected output pixel location and the sampled candidate pixel may then be calculated using any desired method, e.g., by using a modified Euclidean distance equation, as shown below, where $r_{output}$ is the distance from the output pixel to the image center, and $k_s$ is a coefficient that controls how much the circular shape of the "standard" blurring disc is distorted:

$$d = \begin{bmatrix} |u| + k_s r_{output} \\ |v| \end{bmatrix}.$$ (Eqn. 10)

The inclusion weight ($W_{inclusion}$) may then determine whether the output pixel exists within the shape projected by the sampled pixel and to what extent. The inclusion weighting function, shown below in Eqn. 11, thus allows for the modified blurring shapes to have an outer edge with both roll-off and overshoot, which may be achieved via the use of an edge gain constant ($k_{eg}$) and edge sharpness ($k_{es}$) constant, each of which may be tuned for a desired implementation.

Thus, according to some such embodiments that allow for modified, non-circular blurring shapes, the inclusion weight for a given sampled candidate pixel may be determined as follows:

$$W_{inclusion} = \max(H(1-d), k_{eg} - k_{eg}k_{es}(d-1)^2)$$ (Eqn. 11), wherein $k_{eg}$ and $k_{es}$ are the tuning constants described above, d is the modified Euclidean distance from Eqn. 10 above, and H refers to a standard Heaviside step function, which outputs a value of 0 for input values that are zero or smaller and outputs a value of 1 for input values that are greater than zero.

Background Weight

Discussion will now turn to the computation of background weight (324), as illustrated in FIG. 3. The background weight is designed to bias the output pixel's computed value away from the values of neighboring foreground pixels (or pixels that are at least predicted to be more in the foreground than the output pixel), in order to reduce undesirable 'blooming' artifacts in the resultant synthetic SDOF image, i.e., artifacts where the foreground region appears to be surrounded by a glowing artifact.

Thus, according to some embodiments, the background weight ($W_{background}$) may be determined as is shown in the exemplary equation below:

$$W_{background} = \text{smoothstep}(0, k_{maxBlur}, I_{blur}(x+i, y+1))$$ (Eqn. 12), wherein $k_{maxBlur}$ refers to a maximum blur radius supported by the sparse rendering process, $I_{blur}(x+i, y+j)$ refers to the blurring radius of the given candidate pixel at offset (i, j) from the current output pixel, and the smoothstep function may be implemented, e.g., as described above with reference to Eqn. 6.

Area Weight

Discussion will now turn back now to the computation of area weight (326), as illustrated in FIG. 3. The area weight ($W_{area}$) is designed to mimic the preservation of energy principles involved in optics and, in particular, the spreading out of a light source's energy over a circular- or disc-shaped when it is captured out of focus. For example, in the case of an in-focus point light source, most of its energy is concentrated in a tiny area. For an out of focus light, by contrast, the light's energy is spread out more, so its contribution to any particular neighboring pixel in the image is smaller. Thus, the area weight is also designed to be inversely proportional to the blurring radius or "disc area" of the candidate pixel, e.g., as is shown in the exemplary area weight equation below:

$$W_{area} = \frac{1}{2\pi I_{blur}(x+i, y+j)^2}, \quad \text{(Eqn. 13)}$$

wherein $I_{blur}(x+i, y+j)$ refers to the blurring radius of the given candidate pixel at offset (i, j) from the current output pixel.

Relative Weight

Discussion will now turn back to the computation of relative weight (328), as illustrated in FIG. 3. The relative weight is designed to account for occluded pixels in the image, e.g., background objects that are blocked from view by one or more objects that are closer to the foreground of the scene. According to some embodiments, the relative weight may be calculated by comparing the blur radius of the present output pixel and the blur radius of each of the sample candidate pixels. In particular, if the blur radius of the present output pixel is significantly different than the blur radius of a particular candidate pixel, then the particular candidate pixel may be given a lower relative weight.

This insight follows the physical world principle that, if a point in the foreground is itself occluding an object in the background, then the spreading behind the object should not influence the foreground output pixel. In other words, it would be physically inaccurate if the bokeh disc of a point light source in the scene background spread into or over an object that is in front of it in the scene. Thus, according to some embodiments, if a background candidate pixel's intensity is above a certain threshold, the relative weight may be used to weight such background candidate pixels to 0, so that the synthetic SDOF blurring process described herein does not allow a background light source to influence a pixel that is shallower in the scene.

Thus, according to some embodiments, the relative weight ($W_{relative}$) may be determined as is shown in the exemplary equation below:

$$W_{relative} = \text{smoothstep}(-k_{rw}, +k_{rw}, I_{blur}(x+i, y+j) - I_{blur}(x, y)) \quad \text{(Eqn. 14)},$$

wherein $+k_{rw}$ and $-k_{rw}$ refer, respectively, to a maximum and minimum relative weight supported by the sparse rendering process, $I_{blur}(x+i, y+j)$ refers to the blurring radius of the given candidate pixel at offset (i, j) from the current output pixel, $I_{blur}(x, y)$ refers to the blurring radius of the current output pixel, and the smoothstep function may be implemented, e.g., as described above with reference to Eqn. 6.

Calculating the Final Output Pixel Weighted Sum Value

As may now be appreciated, according to some embodiments, the formula for computing a blurred output value for a specified output pixel may be represented by the following weighted sum:

$$I_{out}(x, y, z) = \frac{\sum_{(i,j) \in n}(W_{area} \times W_{background} \times W_{inclusion} \times W_{boost} \times G_{boost} \times W_{relative} \times I_{in}(x+i, y+j, z)) + \varepsilon I_{in}(x, y, z)}{\sum_{(i,j) \in n}(W_{area} \times W_{background} \times W_{inclusion} \times W_{boost} \times W_{relative}) + \varepsilon}, \quad \text{(Eqn. 15)}$$

wherein z is a color channel value, x and y are the coordinates of the present output pixel, i and j are the coordinate offsets of the candidate pixels corresponding to the output pixel at coordinates (x, y), $W_{area}$ is the aforementioned area weight, $w_{background}$ is the aforementioned background weight, $W_{inclusion}$ is the aforementioned inclusion weight, $W_{boost}$ is the aforementioned highlight boosting weight gain, $G_{boost}$ is the aforementioned highlight boosting intensity gain, $W_{relative}$ is the aforementioned relative weight, and £ is a very small weighting factor applied to the intensity value of the base input pixel to prevent numerical instability. Note that the denominator in Eqn. 15 is used to normalize the output result, i.e., to divide by the final sum of all the weight-products (excluding the $G_{boost}$ term, which, as described above, is intended to actually intentionally increase the intensity of the sampled pixel in the output result).

The various weighted values for each candidate pixel in a given output pixel's randomly-sampled neighborhood (may be accumulated by accumulator 330 of FIG. 3, which may be initialized with the value of the input pixel at the same location and multiplied by a small epsilon value, i.e., a value that may be used to prevent invalid results when no candidate pixels are determined to be included in the output pixel. The epsilon value may be determined, e.g., by the numerical limitations of the accumulator, i.e., chosen to be as small as possible, while still allowing the weighted input pixel to be accurately represented. Once all the candidate pixels for the specified output pixel location have been considered, the accumulated weighted color (i.e., light intensity) values may be normalized by the accumulated weight, and an output value for the current output pixel may be calculated (334). Once the per input pixel operations (310) have concluded for all desired pixels in the input image 304, the process may perform any desired post-processing on the image data (e.g., the anti-aliasing and/or selective upsampling processes described above with reference to FIG. 2B), thus resulting in an output 304 of an efficiently-computed synthetic SDOF image 260.

Random Sample Distribution

As mentioned above, in some instances, the distribution of randomly-sampled candidate pixel points may need to be configured, re-shaped, and/or weight-compensated in some fashion to account for either computational shortcuts taken in the random sample generation process or in order to make it more likely a natural blurring result is achieved (i.e., a blurring result that does not disproportionately oversample a certain region of a pixel's neighborhood).

Figure 6:
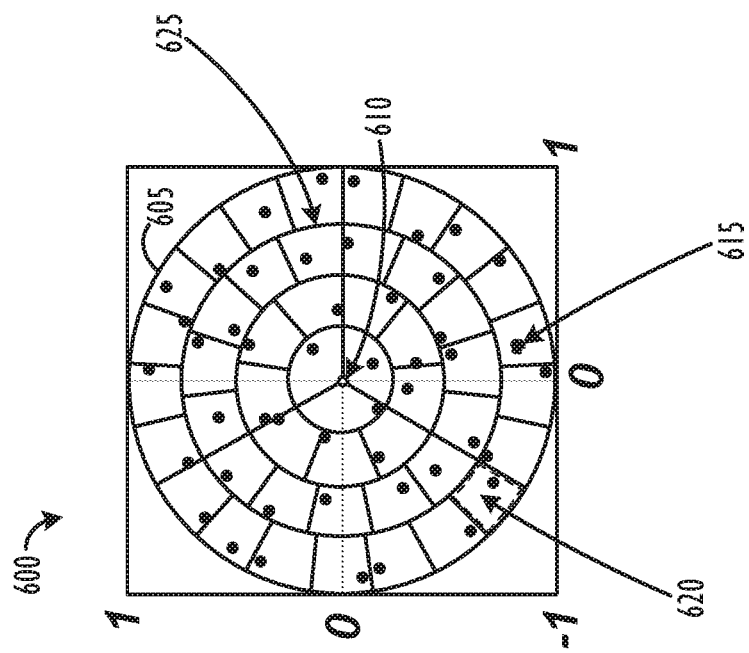
FIG. 6 illustrates an exemplary process of randomly sampling a circular-shaped disc with candidate pixels using ring segments with uniform sampling probabilities, according to one or more embodiments.

Turning now to FIG. 6, an exemplary illustration 600 of a process of randomly sampling a region, e.g., circular-shaped disc 605 centered at the location of an exemplary output pixel 610, with candidate pixels 615 using ring segments 620 with uniform sampling probabilities is shown.

According to some embodiments, as a first step in generating the location of the sampled candidate pixels, two sets of random, uniformly-distributed numbers may be generated. For explanatory purposes, one set of numbers is mapped from −1 to +1 on an x-axis, and the other set of numbers is mapped from −1 to +1 on a y-axis. As may be understood, this will result in a rectangular distribution of sampled candidate pixels (and, more specifically, a square distribution if the two sets are generated over the same range). However, in the case of attempting to simulate a circular blurring disc 605, as is shown in FIG. 6, there will be a portion of the randomly-generated samples that lie within the square, but outside the circle. These points would be physically irrelevant to a circular blur having the radius specified by the blur map. So, one approach to disregard these points would be to simply discard and sample points that were outside the blurring circle radius. However, this would potentially be inefficient, and it would be perhaps even more inefficient to determine whether or not a given point lies within the blurring shape—especially for shapes that are more complex than circles (e.g., stars, hearts, hexagons, octagons, etc.).

Moreover, the random number generators—or pseudorandom number generators (PRNGs), as would more likely be employed in a real implementation—used to generate the aforementioned x- and y-coordinates of the sample candidate pixels may produce low quality results. For example, the pseudorandomly-generated sample candidate pixel coordinates may end up being overly clustered, i.e., not providing adequate coverage of the circular sampling region.

In order to address the potential shortcomings of using a simple rectangular distribution of sampled candidate pixels, according to some embodiments, the circular sampling region may instead be divided into two or more rings 625, which may each be further subdivided into two or more sub-regions, e.g., segments 620. In some embodiments, the segments 620 may be equal area segments, e.g., to ensure a more uniform sampling of the circular sampling region. Next, one (or more) sample points 615 may be taken from each ring segment 620, wherein the sampling probability may be configured to be uniform across each ring segment 620. This approach helps to enforce uniformity of the sampling across the sampling disc region 605, allowing for adequate and representative sampling of the disc region 605 with a potentially smaller number of samples than other techniques, e.g., those that do not sub-divide the sampling region into sub-regions of uniform sampling probability.

Thus, according to some embodiments, the coordinate offsets of the sampling points (i, j) with respect to the current output pixel may be computed using the following equation:

$$\begin{bmatrix} i \\ j \end{bmatrix} = k_{maxBlur} \sqrt{\frac{p^2 + R_1(2p+1)}{(N_{rings})^2}} \begin{bmatrix} \sin\left(2\pi \frac{q+R_2}{N_{segments}(p)}\right) \\ \cos\left(2\pi \frac{q+R_2}{N_{segments}(p)}\right) \end{bmatrix} I_{blur}(x, y), \quad \text{(Eqn. 16)}$$

wherein: $k_{maxBlur}$ is a coefficient defining the maximum amount of blurring permitted in the system; $I_{blur}(x,y)$ is the blurring radius for the output pixel (i.e., the radius of the circular sampling region); $N_{rings}$ is the number of rings used in the sampling region; p is a number between 0 and $N_{rings}-1$; $N_{segments}(P)$, i.e., the number of segments in the $p^{th}$ ring, is defined as: 6p+3; q is a number between 0 and ($N_{segments}(p)-1$); $R_1$ and $R_2$ are random (or pseudorandom) number generators that generate numbers between 0 and 1, inclusive; and the sum of segments across all the rings in the sampling region is defined as: $3*(N_{rings})^2$.

Other methods of generating randomly-sampled candidate pixel locations may be found in the '154 application, incorporated by reference above.

Figure 7:
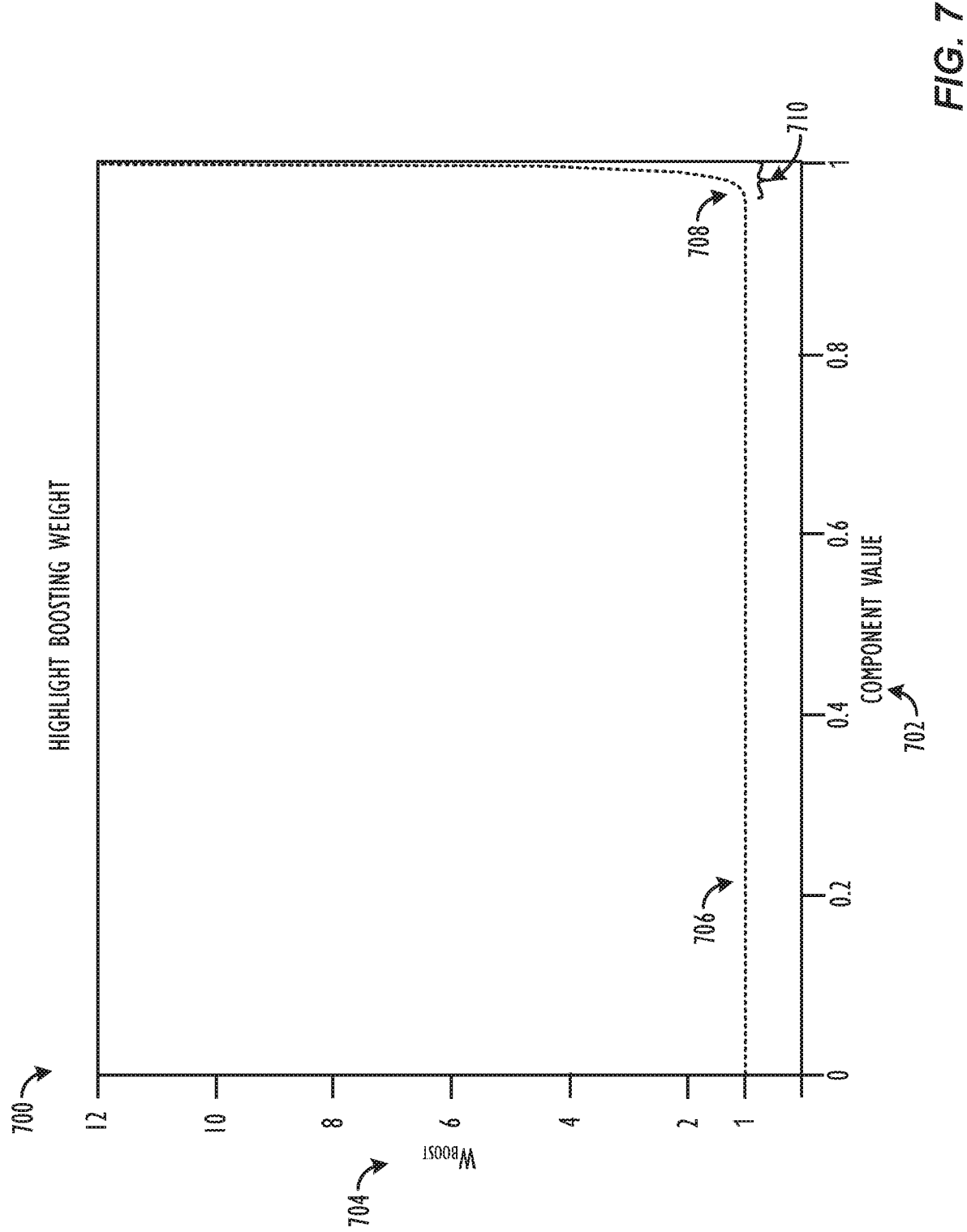
FIG. 7 is a graph illustrating the relationship between pixel component value and highlight boosting weight, according to one or more embodiments.

Turning now to FIG. 7, a graph 700 illustrating the relationship between pixel component value (e.g., a color intensity value) on the x-axis 702 and highlight boosting weight gain ($W_{boost}$) on the y-axis 704 is shown, according to one or more embodiments. As described above, according to some embodiments, via the use of a very large exponent, $k_{be}$, the highlight boosting weight gain may advantageously stay at (or very close) to 1.0, i.e., not affecting the component value, over all regions 706 of component value across the x-axis, other than a sub-range of the largest component values 710 (e.g., 240 or greater, in an 8-bit system; or 0.95 or greater, on a component value scale that has been normalized from 0 to 1, as is shown in FIG. 7). Within region 710, depending on the exponent value used, the highlight boosting weight gain curve may rapidly increase in region 708 (e.g., providing a weighting boost of 2×-12×), to attempt to more accurately reflect the actual likely brightness of the point source that caused the image sensor to clip, including causing the boosted pixels to clip again in the resultant synthetic SDOF image, thereby providing a more natural and realistic-looking SDOF effect.

Overall Process Flow

Figure 8:
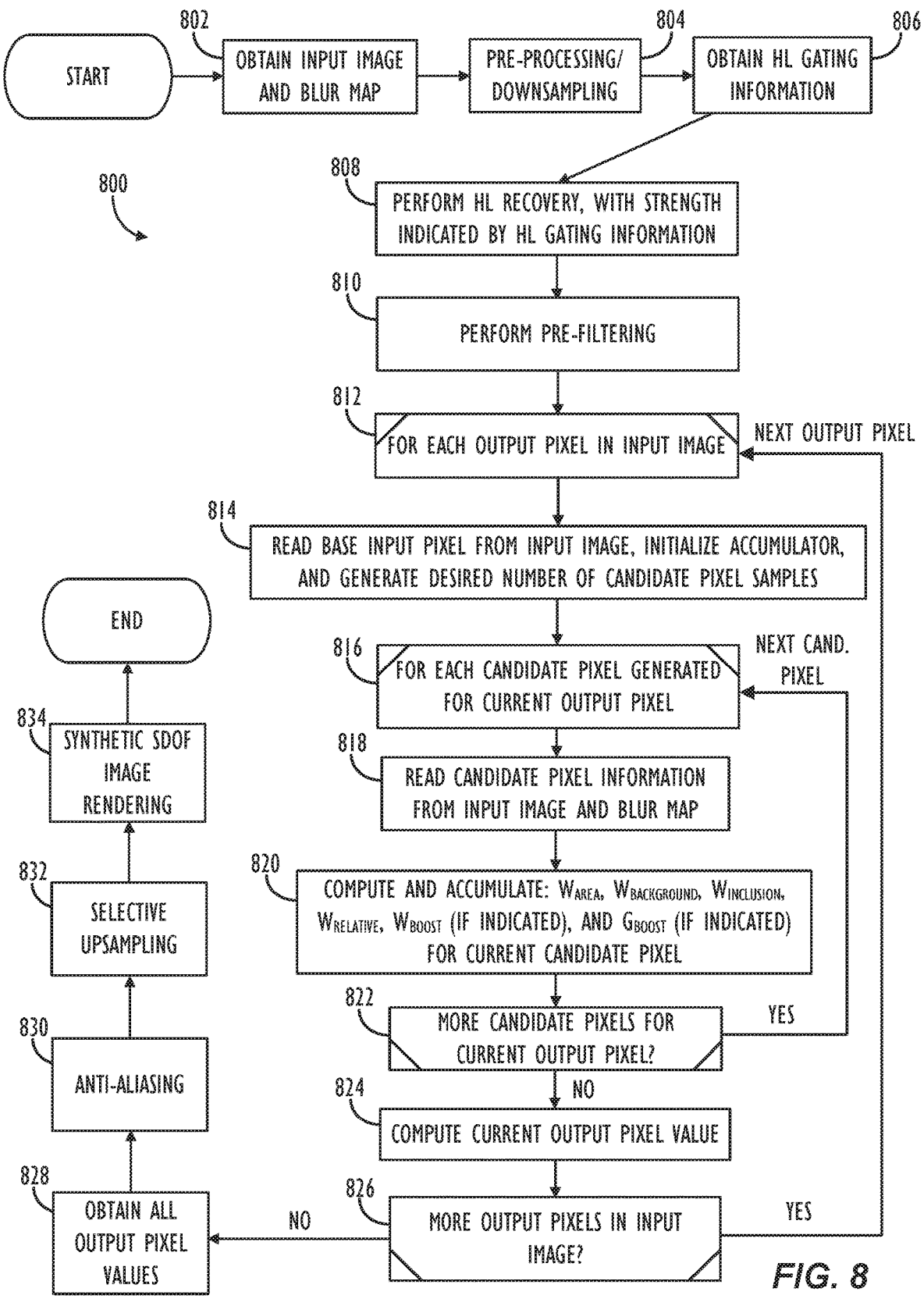
FIG. 8 is a flowchart illustrating a method for synthesizing SDOF effects, according to one or more embodiments.

Turning now to FIG. 8, a flowchart 800 illustrating a method for synthesizing SDOF effects is illustrated, according to one or more embodiments that have been described herein. First, the method may start at Step 802 by obtaining an input image and its corresponding blur map. Next, at Step 804, any desired pre-processing or downsampling may be performed on the input image, as has been discussed above.

Next, at Step 806, Highlight Gating information may be obtained from the input image. As described above, the Highlight Gating information may be stored in the image's metadata (e.g., in the form of various tuning parameters), and may reflect an indication whether and/or to what extent the highlight recovery and boosting operations described herein should be applied. Next, at Step 808, e.g., if so indicated by the Highlight Gating information, the method may perform highlight recovery operations. Highlight recovery operation 808 may be performed in accordance with the various techniques described herein, e.g., involving a processing list of image pixel tiles and a series of iterations of diffuse filters being applied to the regions of the image deemed to include background clipped pixels to attempt to recover some color information from non-clipped neighboring pixels.

Next, at Step 810, one or more pre-filtering operations may be performed on the input image, if so desired. Pre-filtering operations may comprise operations such as those described above with reference to Step 254 of FIG. 2B, e.g., operations designed to apply a desired amount of blurring to small point light sources in the image in order to reduce the amount of grain present in bokeh circles resulting from such light sources after the application of synthetic SDOF effects. In some embodiments, highlight boosting techniques, such as those described herein, may also be applied to the pixels included in the filtering window of a filtering kernel used in the pre-filtering operations.

Next, for each output pixel in the input image (i.e., the operational loop starting at Step 812), the process may perform Step 814, which may entail reading the present base input pixel's information from the input image and/or blur map, initializing the accumulator's value for the present input pixel, and/or generating the desired number of random candidate pixel samples in the neighborhood of the present output pixel. If necessary, the process may also perform any desired shaping and/or weighting of the randomly-generated candidate pixel samples, e.g., so that the samples are in the desired sampling distribution shape and/or are evenly distributed over the desired sampling region, as described above with reference to FIG. 6.

Then, at Step 816, for each sample candidate pixel in the shaped distribution of candidate pixel samples, the process may read in the present candidate pixel's information form the input image and blur map (Step 818) and then compute the various aforementioned weights, such as the area weight, background weight, inclusion weight, relative weight, highlight boosting weight gain (if indicated as being needed by the gating information), and/or highlight boosting intensity gain (if indicated as being needed by the gating information) for the current candidate pixel (Step 820). As long as there are further candidate pixels to process (i.e., 'Y' at Step 822), the process may return to Step 816 to repeat Steps 818 and 820 on the further candidate pixels, continuing to accumulate the results for each candidate pixel. Finally, when there are no further candidate pixels to process for the current output pixel (i.e., 'N' at Step 822), the process may proceed to Step 824. At Step 824, the weighted values for each candidate pixel in the generated candidate pixel distribution for the current output pixel may be normalized (e.g., based on the sum of all the weighting values), thereby resulting in an updated blurred value for the current output pixel.

Next, if there are additional output pixels to process (i.e., 'Y' at Step 826), the method may return to Step 812. If however, all output pixels have been processed (i.e., 'N' at Step 826), the method may proceed to Step 828 to obtain the set of all output pixel values, which will represent the values of the pixels in the synthesized SDOF image.

Next, at Step 830, the method may proceed to perform anti-aliasing operations, if so desired. According to some embodiments, the anti-aliasing operation may work by applying a variable radius Gaussian blur to the sampled image, to smooth out the aliasing noise. According to some embodiments, a small variable radius may be used, and a fixed number of filter taps (e.g., 5 taps, 7 taps, 9 taps, etc.) may be used to calculate the Gaussian weights per pixel, where the Gaussian function's standard deviation value may be linearly proportional to the circle of confusion size for the given output pixel. The weight of each pixel may further be multiplied by its blur radius, in order to prevent sharp (i.e., in focus) pixels from bleeding into neighboring blurred pixel regions.

As also mentioned above, if so desired, a selective upsampling operation (Step 832) may also be applied to the image data. According to some embodiments, the selective upsampling operation's input may come from the output of the anti-aliasing operation at Step 830. In some embodiments, the process of constructing the final blurred synthetic SDOF image may further comprise performing a selective up-sampling operation on the low-resolution background blurred regions of the image. The foreground regions from the original full-resolution input image may then be put back into the constructed synthetic SDOF image on top of the blurred background portions of the image (i.e., rather than using the blurred foreground pixels calculated by the sparse sampling and weighting techniques that have been described herein).

Finally, the method may proceed to Step 834 to render the final output blurred synthetic SDOF image, i.e., using all the desired newly-calculated, blurred values from the performance of method 800. Once the output SDOF image has been synthesized (and optionally stored and/or displayed), the method 800 may end.

According to some other embodiments, a blurred synthetic SDOF image may also be generated using alternative techniques to those described above. For example, according to some such embodiments, artifacts in the resulting synthetic SDOF images that would be caused, e.g., by inaccurate blur maps, may be mitigated. For example, in the case of near foreground objects, background pixels in the image may be misclassified as foreground pixels, resulting in sharp and unnatural looking artifacts in the generated synthetic SDOF image. In such instances, the artifacts may be mitigated, e.g., by filtering the image's blur map prior to synthesizing the SDOF effects, as will be discussed below.

According to some such embodiments, the filtering may be implemented using an approach that increases the blur radius of foreground pixels that are classified as being located near background pixels—without affecting the background pixels themselves. In some examples, this approach may comprise the use of a so-called selective average filter, which may seek to find the element-wise average for a subset of pixels surrounding a given pixel in the image's blur map and then select or blend between the original blur radius and the derived average, depending on one or more criteria, such as the maximum of the two values. This process of filtering or blurring the blur map itself may be performed in an iterative manner, using a smaller filter size, to improve computational efficiency. The size of the filter and number of iterations will be dependent on the processing capabilities and/or time constraints of a given implementation. The aim of this iterative blur map filtering process is to reduce the prevalence of occlusion boundaries in the blur map, e.g., where some background pixels may be incorrectly classified as foreground pixels. The filtered blur map may then be used to generate an improved synthetic SDOF image. Such techniques are based on insights into the human visual acuity system and, in particular, the insight that the human eye is more sensitive to background pixels being incorrectly sharp than it is to foreground pixels being incorrectly blurry.

In still other embodiments, if a sampled candidate pixel has a blur map value of 0, it may be discarded from the sparse sampling process altogether out of an abundance of caution, i.e., to avoid unintentionally bleeding some foreground colors into the background clipped pixel blurring process, e.g., during the highlight recovery and/or highlight boosting stages.

Exemplary Devices

Figure 9:
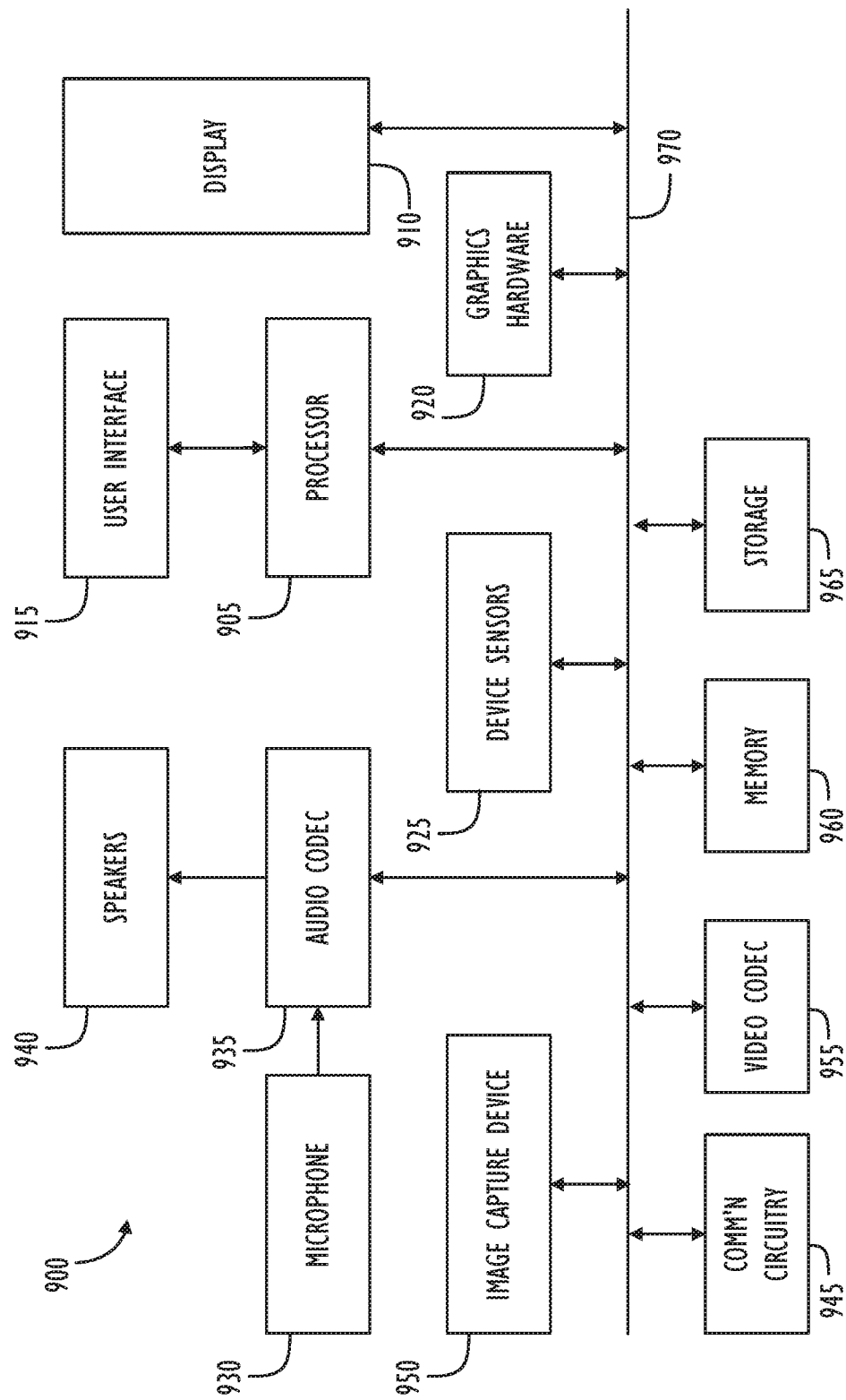
FIG. 9 is a block diagram illustrating a programmable imaging device in which one or more of the techniques disclosed herein may be implemented.

Turning now to FIG. 9, a simplified functional block diagram of illustrative electronic device 900 is shown, according to one or more embodiments. Electronic device 900 could be, for example, a mobile telephone, personal media device, portable camera, or a tablet, notebook or desktop computer system. As shown, electronic device 900 may include processor 905, display 910, user interface 915, graphics hardware 920, device sensors 925 (e.g., proximity sensor/ambient light sensor, accelerometer and/or gyroscope), microphone 930, audio codec(s) 935, speaker(s) 940, communications circuitry 945, image capture device 950, which may, e.g., comprise single or multiple camera units/optical sensors having different characteristics, video codec(s) 955, memory 960, storage 965, and communications bus 970.

Processor 905 may execute instructions necessary to carry out or control the operation of many functions performed by device 900 (e.g., such as the generation and/or processing of images in accordance with the various embodiments described herein). Processor 905 may, for instance, drive display 910 and receive user input from user interface 915. User interface 915 can take a variety of forms, such as a button, keypad, dial, a click wheel, keyboard, display screen and/or a touch screen. User interface 915 could, for example, be the conduit through which a user may view a captured video stream and/or indicate particular frame(s) that the user would like to have a synthetic SDOF image version of (e.g., by clicking on a physical or virtual button at the moment the desired frame is being displayed on the device's display screen). In one embodiment, display 910 may display a video stream as it is imaged. In another embodiment, processor 905 and/or graphics hardware 920 and/or image capture circuitry may contemporaneously generate and/or display a synthetic SDOF version of the imaged video stream, which synthetic SDOF video stream may also be stored in memory 960 and/or storage 965. Processor 905 may be a system-on-chip such as those found in mobile devices and include one or more dedicated graphics processing units (GPUs). Processor 905 may be based on reduced instruction-set computer (RISC) or complex instruction-set computer (CISC) architectures or any other suitable architecture and may include one or more processing cores. Graphics hardware 920 may be special purpose computational hardware for processing graphics and/or assisting processor 905 perform computational tasks. In one embodiment, graphics hardware 920 may include one or more programmable graphics processing units (GPUs).

Image capture device 950 may comprise one or more camera units configured to capture images, e.g., at different zoom levels or at different resolutions, which may be processed to generate a single synthetic SDOF image for each desired 'instance' of the scene (e.g., 15 fps, 30 fps, only when a capture is indicated by a user, etc.), in accordance with this disclosure. Output from image capture device 950 may be processed, at least in part, by video codec(s) 955 and/or processor 905 and/or graphics hardware 920, and/or a dedicated image processing unit incorporated within image capture device 950. Images so captured may be stored in memory 960 and/or storage 965. Memory 960 may include one or more different types of media used by processor 905, graphics hardware 920, and image capture device 950 to perform device functions. For example, memory 960 may include memory cache, read-only memory (ROM), and/or random access memory (RAM). Storage 965 may store media (e.g., audio, image and video files), computer program instructions or software, preference information, device profile information, and any other suitable data. Storage 965 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 960 and storage 965 may be used to retain computer program instructions or code organized into one or more modules and written in any desired computer programming language. When executed by, for example, processor 905 such computer program code may implement one or more of the methods described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory program storage device comprising instructions stored thereon to cause one or more processors to:
   obtain a first image comprising a first plurality of pixels having values;
   obtain a first blur map, wherein the first blur map comprises a plurality of blur values, each blur value corresponding to a pixel in the first plurality of pixels;
   for each of one or more pixels of the first plurality of pixels, perform the following operations:
      select a second plurality of candidate pixels surrounding the pixel from the one or more pixels of the first plurality of pixels being operated upon; and
      compute a blurred value for the pixel from the one or more pixels of the first plurality of pixels being operated upon based, at least in part, on a weighted combination of one or more characteristics of each of the second plurality of candidate pixels,
      wherein a first one of the one or more characteristics of each of the second plurality of candidate pixels comprises a weighting factor based on a degree to which the respective candidate pixel's corresponding value in the first plurality of pixels represents a background highlight in the first image; and
   generate a blurred version of the first image based, at least in part, on the computed blur values of the one or more pixels of the first plurality of pixels.

2. The non-transitory program storage device of claim 1, wherein the degree to which a respective candidate pixel's value in the first plurality of pixels represents a background highlight in the first image is further based, at least in part, on the respective candidate pixel's corresponding blur value in the first blur map.

3. The non-transitory program storage device of claim 1, wherein a second one of the one or more characteristics of each of the second plurality of candidate pixels comprises an intensity boosting factor based on a degree to which the respective candidate pixel's corresponding value in the first plurality of pixels represents a background highlight in the first image.

4. The non-transitory program storage device of claim 1, wherein the instructions to select a second plurality of candidate pixels further comprise instructions to:
   generate a random distribution of pixel locations.

5. The non-transitory program storage device of claim 4, wherein the random distribution of pixel locations lie within a sampling region centered at the location of the pixel from the one or more pixels of the first plurality of pixels being operated upon, and wherein the sampling region comprises a plurality of sub-regions having uniform sampling probabilities.

6. The non-transitory program storage device of claim 1, further comprising instructions stored thereon to cause one or more processors to:
   update one or more component intensity values for one or more of the first plurality of pixels determined to be representative of clipped background pixels,
   wherein the instructions to update one or more component intensity values for a given pixel of the first plurality of pixels comprise instructions to compute a weighted average of one or more component intensity values of one or more non-clipped background pixels neighboring the given pixel.

7. The non-transitory program storage device of claim 1, wherein a candidate pixel's corresponding blur value in the first blur map is used to calculate a degree to which a component intensity value for the candidate pixel should be included in a given weighted combination.

8. An electronic device, comprising:
one or more image capture devices;
one or more processors; and
a memory coupled to the one or more processors, wherein instructions are stored in the memory, and wherein the instructions, when executed, cause the one or more processors to:
  obtain a first image comprising a first plurality of pixels having values from the one or more image capture devices;
  obtain a first blur map, wherein the first blur map comprises a plurality of blur values, each blur value corresponding to a pixel in the first plurality of pixels;
  for each of one or more pixels of the first plurality of pixels, perform the following operations:
    select a second plurality of candidate pixels surrounding the pixel from the one or more pixels of the first plurality of pixels being operated upon; and
    compute a blurred value for the pixel from the one or more pixels of the first plurality of pixels being operated upon based, at least in part, on a weighted combination of one or more characteristics of each of the second plurality of candidate pixels,
    wherein a first one of the one or more characteristics of each of the second plurality of candidate pixels comprises a weighting factor based on a degree to which the respective candidate pixel's corresponding value in the first plurality of pixels represents a background highlight in the first image; and
  generate a blurred version of the first image based, at least in part, on the computed blur values of the one or more pixels of the first plurality of pixels.

9. The electronic device of claim 8, wherein the degree to which a respective candidate pixel's value in the first plurality of pixels represents a background highlight in the first image is further based, at least in part, on the respective candidate pixel's corresponding blur value in the first blur map.

10. The electronic device of claim 8, wherein a second one of the one or more characteristics of each of the second plurality of candidate pixels comprises an intensity boosting factor based on a degree to which the respective candidate pixel's corresponding value in the first plurality of pixels represents a background highlight in the first image.

11. The electronic device of claim 8, wherein the instructions to select a second plurality of candidate pixels further comprise instructions to:
  generate a random distribution of pixel locations.

12. The electronic device of claim 11, wherein the random distribution of pixel locations lie within a sampling region centered at the location of the pixel from the one or more pixels of the first plurality of pixels being operated upon, and wherein the sampling region comprises a plurality of sub-regions having uniform sampling probabilities.

13. The electronic device of claim 8, wherein the instructions, when executed, further cause the one or more processors to:
  update one or more component intensity values for one or more of the first plurality of pixels determined to be representative of clipped background pixels,
  wherein the instructions to update one or more component intensity values for a given pixel of the first plurality of pixels comprise instructions to compute a weighted average of one or more component intensity values of one or more non-clipped background pixels neighboring the given pixel.

14. The electronic device of claim 8, wherein a candidate pixel's corresponding blur value in the first blur map is used to calculate a degree to which a component intensity value for the candidate pixel should be included in a given weighted combination.

15. An image processing method, comprising:
  obtaining a first image comprising a first plurality of pixels having values from one or more image capture devices;
  obtaining a first blur map, wherein the first blur map comprises a plurality of blur values, each blur value corresponding to a pixel in the first plurality of pixels;
  for each of one or more pixels of the first plurality of pixels, performing the following operations:
    selecting a second plurality of candidate pixels surrounding the pixel from the one or more pixels of the first plurality of pixels being operated upon; and
    computing a blurred value for the pixel from the one or more pixels of the first plurality of pixels being operated upon based, at least in part, on a weighted combination of one or more characteristics of each of the second plurality of candidate pixels,
    wherein a first one of the one or more characteristics of each of the second plurality of candidate pixels comprises a weighting factor based on a degree to which the respective candidate pixel's corresponding value in the first plurality of pixels represents a background highlight in the first image; and
  generating a blurred version of the first image based, at least in part, on the computed blur values of the one or more pixels of the first plurality of pixels.

16. The method of claim 15, wherein the degree to which a respective candidate pixel's value in the first plurality of pixels represents a background highlight in the first image is further based, at least in part, on the respective candidate pixel's corresponding blur value in the first blur map.

17. The method of claim 15, wherein a second one of the one or more characteristics of each of the second plurality of candidate pixels comprises an intensity boosting factor based on a degree to which the respective candidate pixel's corresponding value in the first plurality of pixels represents a background highlight in the first image.

18. The method of claim 15, wherein selecting a second plurality of candidate pixels further comprises:
  generating a random distribution of pixel locations over a sampling region.

19. The method of claim 18, wherein the sampling region comprises a plurality of sub-regions having uniform sampling probabilities.

20. The method of claim 15, wherein a candidate pixel's corresponding blur value in the first blur map is used to calculate a degree to which a component intensity value for the candidate pixel should be included in a given weighted combination.

* * * * *